United States Patent
Otsuka et al.

(10) Patent No.: US 6,266,159 B1
(45) Date of Patent: Jul. 24, 2001

(54) COMMUNICATION DEVICE

(75) Inventors: Shuji Otsuka; Kunihiro Yasui, both of Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 08/947,386

(22) Filed: Oct. 8, 1997

(30) Foreign Application Priority Data

| Oct. 9, 1996 | (JP) | 8-268563 |
| Oct. 9, 1996 | (JP) | 8-268565 |
| Oct. 9, 1996 | (JP) | 8-268566 |

(51) Int. Cl.[7] .................................................. H04N 1/00
(52) U.S. Cl. ...................................... 358/405; 379/100.01
(58) Field of Search ................................. 358/400, 402, 358/401, 403, 404, 405, 407, 434, 435, 436, 439, 440, 468; 379/100.01, 100.09, 100.12, 100.17

(56) References Cited

U.S. PATENT DOCUMENTS

| 5,130,818 | * | 7/1992 | Takokoro | 358/407 |
| 5,220,677 | * | 6/1993 | Brooks | 455/53.1 |
| 5,224,156 | * | 6/1993 | Fuller | 379/100 |
| 5,283,665 | * | 2/1994 | Ogata | 358/434 |
| 5,586,185 | * | 12/1996 | Shibata et al. | 380/21 |
| 5,757,911 | * | 5/1998 | Shibata | 380/18 |
| 5,825,876 | * | 10/1998 | Peterson, Jr. | 380/4 |
| 5,864,560 | * | 1/1999 | Li et al. | 370/276 |
| 6,081,199 | * | 6/2000 | Hogi | 340/825.31 |
| 6,108,103 | * | 8/2000 | Kurozasa | 358/405 |

* cited by examiner

*Primary Examiner*—Jerome Grant, II
(74) *Attorney, Agent, or Firm*—Oliff & Berridge, PLC.

(57) ABSTRACT

The communication device is provided with a confidential data input/output control unit for permitting in S98 operations of either a confidential data input unit or a confidential data output unit based on predetermined operations performed by the user ("yes" in S87) or predetermined data inputted via the communication circuit ("yes" in S88) even when the communication circuit is connected in S84 based on the user's execution of another predetermined operation ("yes" in S83) in response to calling signals inputted via the communication circuit. Hence, even when the user answers the telephone in response to the telephone ring, the caller can still access a message box without having to first hang up and redial.

28 Claims, 12 Drawing Sheets

COMMUNICATION DEVICE

BACKGROUND OF THE INVENTION

1. Field of the Invention

The present invention relates to a communication device having a confidential data storage area for storing confidential data for specific individuals transmitted from remote communication devices via a communication circuit.

2. Description of the Related Art

For example, a storage area used in facsimile devices, which is often called a "message box," is provided with a plurality of storage areas for storing confidential data for specific individuals. Each of these storage areas is allocated to a different specific individual. When the facsimile device is set in an answering mode, facsimiles or voice can be transmitted via a telephone circuit from remote facsimile devices or similar devices having communication functions and recorded in a storage area corresponding to a designated message box number. Then, a specific individual wishing to know the contents of messages sent to him or her can directly operate the facsimile device to extract the contents of this message box by performing prescribed operations that include the entering of a personal identification number (PIN) or security access code. The specific individual can also extract the messages via the telephone circuit using remote facsimile devices by also performing the prescribed operations. In other words, when the data stored in the storage area corresponding to the message box is facsimile data, the data can be printed out on recording paper. When the stored data is voice data, the data can be played back as voice data from a speaker.

However, conventional facsimile devices are inconvenient in that messages cannot be inputted into the message box via a telephone circuit unless the facsimile device has bene set to a specific mode, such as the answering mode. Further, the contents of the message box cannot be extracted via a telephone circuit unless the facsimile device is in this specific mode. Hence, when a person calls the facsimile device not in the answering mode to input a message into the message box, that person must wait until someone answers, request that the facsimile device be set to the answering mode, and then hang up and redial. Moreover, if no one answers the telephone when the facsimile device is not set in the answering mode, it is completely impossible to input a message into the message box. The very same problems occur when the owner of the message box wishes to retrieve the contents of his or her message box via the telephone circuit.

On the other hand, there exist facsimile devices provided with a handset capable of wirelessly transmitting and receiving data between a base unit. The handset is capable of calling a remote communication device and receiving calls from the remote communication devices even when the handset is at a position separated from the base unit. Further, the handset is capable of remotely controlling the base unit through the execution of prescribed operations and can set the base unit to be able to receive a facsimile, which is extremely convenient.

However, conventional facsimile devices are inconvenient in that the handset cannot be used to control the storing of data in a message box for a specific individual, which data has been transmitted through the telephone wires, nor the outputting through telephone wires of data for a specific individual, which data is stored in the message box. Hence, when a person calls the facsimile device to input a message into the message box, if someone answers on the handset, the caller must request that the facsimile device be set in the answering mode, and then hand up and redial. The very same problem occurs when the owner of the message box wishes to retrieve the contents of his or her message box via a telephone circuit.

SUMMARY OF THE INVENTION

In view of the problems described above, an object of the present invention is to provide a communication device that allows a message box to be accessed without the need to hang up the telephone and redial, even when the user answers the telephone in response to the telephone ring.

Another object of the present invention is to provide a communication device that allows a message to be inputted into a message box not only when the facsimile device is in the answering mode, but also when the facsimile device is in a facsimile/telephone switching mode and a manual reception mode.

Another object of the present invention is to provide a communication device which allows the message box to be accessed from a handset.

In order to attain the above and other objects, the present invention provides a communication device capable of transmitting and receiving data via a communication circuit, the device comprising: data reception means capable of receiving confidential data for at least one specific individual via a communication circuit; confidential data storage means capable of storing the received confidential data for the at least one specific individual; confidential data input means for inputting the received confidential data for the at least one specific individual into the confidential data storage means; and confidential data input control means for controlling the confidential data input means to input the received confidential data into the confidential data storage means based on either first predetermined information inputted via the communication circuit or a first predetermined operation performed by a user.

According to another aspect, the present invention provides a communication system for transmitting and receiving data via a communication circuit, the communication system comprising: a base unit capable of transmitting and receiving data via a communication circuit; and a handset capable of wirelessly transmitting and receiving data with the base unit, the handset including detecting means for detecting a user's executed predetermined operation and transmission means for transmitting to the base unit predetermined information corresponding to the user's executed predetermined operation when the detecting means detects the user's executed predetermined operation, wherein the base unit includes: confidential data reception means capable of receiving confidential data for at least one specific individual via the communication circuit; confidential data storage means capable of storing the received confidential data for the least one specific individual; confidential data input means for inputting the received confidential data for the at least one specific individual into the confidential data storage means; and confidential data input control means for controlling the confidential data input means to input the received confidential data into the confidential data storage means based on the predetermined information transmitted from the handset.

According to another aspect, the present invention provides a program storage medium for storing data of a program indicative of a process for controlling a communication device connected to a communication circuit, the communication device including a storage area capable of storing received confidential data for at least one specific individual, the program comprising: a program of receiving confidential data for at least one specific individual via a communication circuit; a program of inputting the received confidential data for the at least one specific individual into the storage area; and a program of controlling the confidential data inputting program to input the received confidential data into the confidential data storage based on either first predetermined information inputted via the communication circuit or a first predetermined operation performed by a user.

According to still another aspect, the present invention provides a program storage medium for storing data of a program indicative of a process for controlling a communication system including a base unit connected to a communication circuit and a handset which wirelessly communicate data with the base unit, the base unit including a confidential data storage area capable of storing confidential data for at least one specific individual, the program comprising: a program of controlling a handset to detect a user's executed predetermined operation; a program of controlling a handset to transmit to the base unit predetermined information corresponding to the user's executed predetermined operation when the user's executed predetermined operation is detected; a program of controlling a base unit to receive confidential data for at least one specific individual via a communication circuit; a program of inputting the received confidential data for the at least one specific individual into the confidential data storage area; and a program of controlling the confidential data input program to input the received confidential data into the confidential data storage area based on the predetermined information transmitted from the handset.

DETAILED DESCRIPTION OF THE PREFERRED EMBODIMENT

A communication device according to a preferred embodiment of the present invention will be described while referring to the accompanying drawings.

Figure 1:
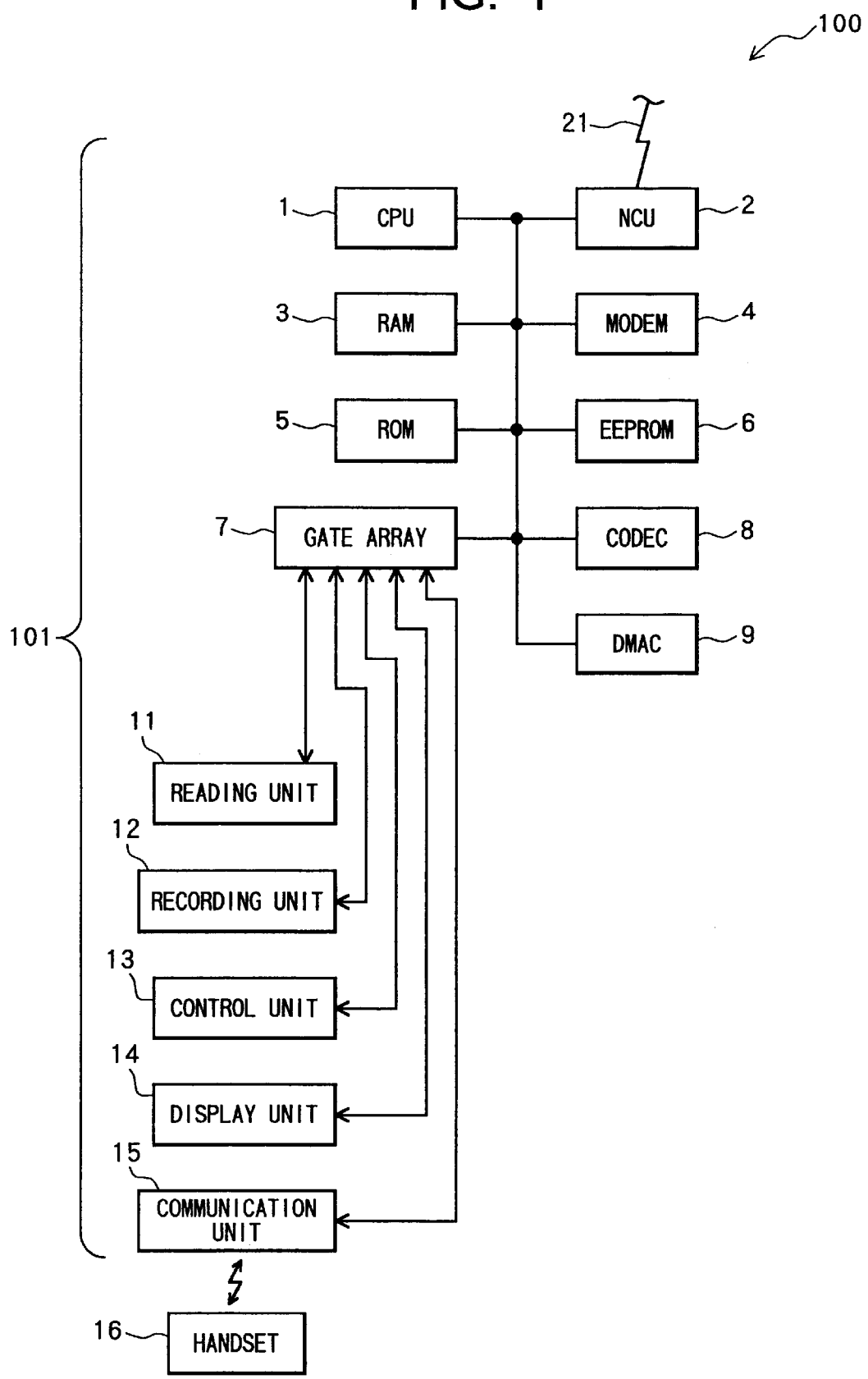
FIG. 1 is a circuit block diagram showing an example of a circuit structure of a facsimile device according to an embodiment of the present invention.

FIG. 1 is a circuit block diagram showing a facsimile device 100 according to an embodiment of the present invention. This facsimile device 100 includes a CPU 1, an NCU (network control unit) 2, a RAM 3, a modem 4, a ROM 5, an EEPROM 6, a gate array 7, a codec 8, a DMAC (direct memory access controller) 9, a reading unit 11, a recording unit 12, a control unit 13, a display unit 14, a communication unit 15, and a cordless handset 16. The components 1–9 above are connected together via bus lines, which include address bus, data bus, and control signal lines. The components 11–15 are all connected to the gate array 7. A telephone circuit 21 is connected to the NCU 2 as one example of a communication circuit.

The CPU 1 is for controlling the entire facsimile device 100. The NCU 2 is connected to he telephone circuit 21 and performs network control. The RAM 3 receives power from a backup power supply, now shown, and stores various data. The RAM 3 is provided with confidential data storage areas having a specific capacity and used to store confidential data for specific individuals. In the present embodiment, confidential data storage areas for five people are allocated in the RAM 3. The modem 4 is for modulating transmission data and for demodulating reception data. The ROM 5 stores various programs including programs shown in FIGS. 5 through 8 and FIGS. 10 through 12. The EEPROM 6 is used to store various entry data or registration data and flags. The gate array 7 serves as an input/output interface for the CPU 1. The codec 8 is for encoding transmission facsimile data and for decoding reception facsimile data, and also for converting transmission voice data to voice signals and reception voice signals to voice data.

The DMAC 9 is for reading data from and writing data to both the RAM 3 and the EEPROM 6. The reading unit 11 is provided with a light source, a CCD sensor unit, a document feeding motor, and the like, for scanning an image from a document and outputting image signals. The recording unit 12 is provided with a printing device such as an ink-jet printer or a thermal-transfer printer and is for recording received image data and the like on a recording paper. The control unit 13 includes a group of keyswitches and the like and for outputting signals in response to a user's operations performed thereto. The display unit 14 is an LCD or the like and for showing various displays in response to commands issue from the CPU 1. The communication unit 15 is for communicating wirelessly with the cordless handset 16. The handset 16 functions both as a cordless telephone and as a cordless remote controller for remotely controlling base unit 101, which is constructed from a remaining part of the facsimile device 100 described above other than the handset 16. That is, the base unit 101 is constructed from the parts 1–9 and 11–15 shown in FIG. 1. Further, the actual circuit structure of the communication unit 15 and of the handset 16 are the same as cordless telephone devices well-known in the art, and, therefore, a description of that structure will be eliminated here. That is, although not shown in the drawings, the handset 16 includes: a ROM storing data of the program shown in FIG. 9; a CPU for executing the program of FIG. 9; several keys shown in FIG. 3; and a wireless communication portion controlled by the CPU to perform a wireless communication with the communication unit 15 of the base unit 101. The ROM, the several keys, and the wireless communication portion are electrically connected to the CPU.

Figure 2:
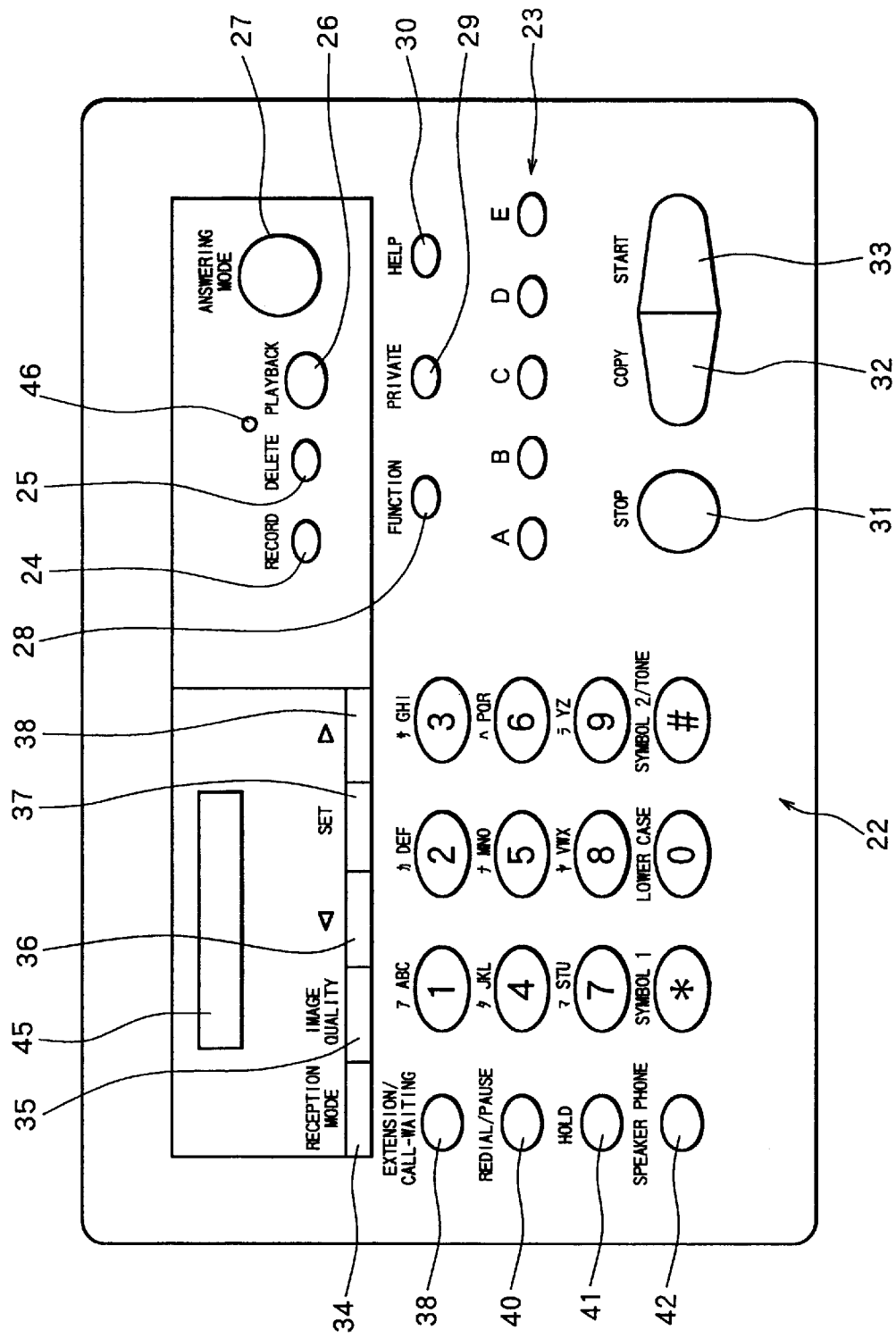
FIG. 2 is a plan view of a control panel provided to the facsimile device of FIG 1.

FIG. 2 is a plan view showing a control panel, which consists of a portion of the control unit 13 and the display unit 14. The control panel is provided with various control keys including twelve dial keys 22, five box designating keys 23, a record key 24, a delete key 25, a playback key 26, an answering mode setting key 27, a function key 28, a private key 29, a help key 30, a stop key 31, a copy key 32, a start key 33, a reception mode key 34, an image quality key 35, a left scroll key 36, a set key 37, a right scroll key 38, an extension/call-waiting key 39, a radial/pause key 40, a hold key 41, and a speaker phone key 42. The control panel is also provided with a display device including an LCD 45 for displaying letters, numbers, symbols, and other characters, and a light-emitting diode (LED) 46 for emitting red light, for example.

The dial keys 22 are used to input a dial number, such as a telephone number or a facsimile number, to allow the user to specify the calling destination. The box designating keys 23 are used to designate a message box allocated to a specific individual. In the present embodiment, five message boxes can be designated with the box designating keys 23 "A"–"E". The record key 24 is used to store in the RAM 3 data inputted via the telephone circuit 21 shown in FIG. 1. The delete key 25 is used to delete data stored in the RAM 3. The playback key 26 is used to play back data stored in the RAM 3. Here, "play back" is used to mean outputting voice data stored in the RAM 3 as voice, or printing out facsimile data stored in the RAM 3 on recording paper. The answering mode setting key 27 is used to set the operating mode of the facsimile device to the answering mode. The function key 28 is used to perform various settings and entries. The private key 29 is used to access a message box or to use telephone directory functions. The help key 30 is used to print out function information with the recording unit 12.

The stop key 31 is used to stop facsimile transmissions and the like. The copy key 32 is used to start a copy operation. The start key 33 is used to start facsimile transmissions and the like. The reception mode key 34 is used to select the reception mode. The image quality key 35 is used to select the precision of image quality. The left scroll key 36 is used to move the cursor on the display screen of the LCD 45 in a leftward direction in the figure. The set key 37 is used to verify settings or entries displayed on the display screen of the LCD 45. The right scroll key 38 is used to move the cursor on the display screen of the LCD 45 in a rightward direction in the figure. The extension/call-waiting key 39 is used for providing an extension and call-waiting function. The redial/pause key 40 is used for providing radial and pause function. The hold key 41 is used to place an external line on hold. The speaker phone key 42 is used to switch from a call state using a telephone receiver, not shown, to a call state not using the handset. The LCD 45 is used to display the contents of entries or settings, operating conditions, and the like. The light-emitting diode (LED) 46 is used to notify the user by blinking, for example, when a voice message or facsimile message is stored in the RAM 3 at either the message box for a specific individual or a general mailbox not intended for a specific individual.

Figure 3:
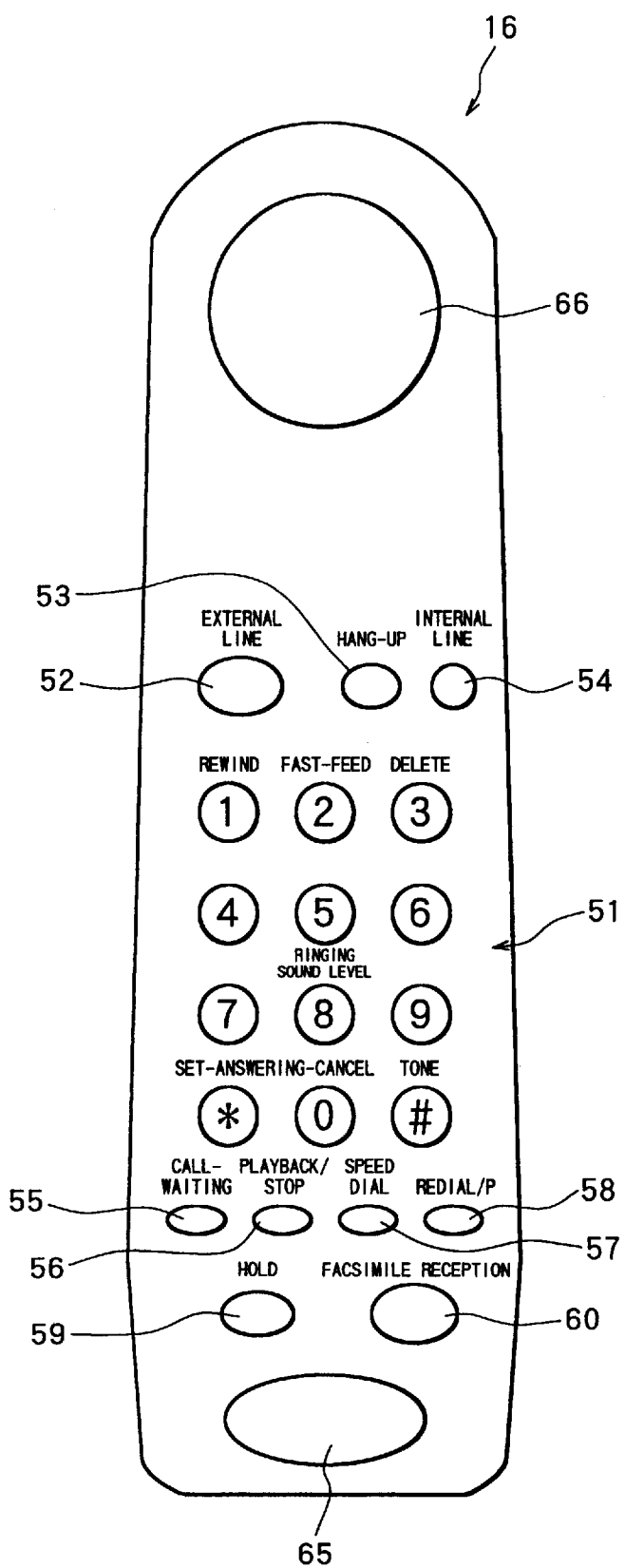
FIG. 3 is a front view of a handset provided to the facsimile device of FIG. 1.

FIG. 3 is a front view of the cordless handset 16. The front of the handset 16 is provided with various control keys including twelve dial keys 51, an external line key 52, a hand-up key 53, an internal line key 54, a call-waiting key 55, a playback/stop key 56, a speed dial key 57, a redial/pause key 58, a hold key 59, and a facsimile reception key 60. The front of the handset 16 is further provided with a microphone 65 and a speaker 66.

The dial keys 51 are used to input a dial number, such as a telephone number or a facsimile number, to allow the user to specify the calling destination. The external line key 52 is used to access an external line. The hang-up key 53 is used to end a call. The internal line key 54 is used to access an internal line. The call-waiting key 55 is used as a call-waiting function to received another call during a call in progress. The playback/stop key 56 is used to play back or to stop the playback of voice data stored in a message box or a general mail box. The speed dial key 57 is used to perform preset speed dial operations. The redial/pause key 58 is used for providing redial function and a pause function. The hold key 59 is used to place an external line on hold. The facsimile reception key 60 is used to receive an incoming facsimile. The microphone 65 and speaker 66 are used for conducting conversation.

Figure 4:
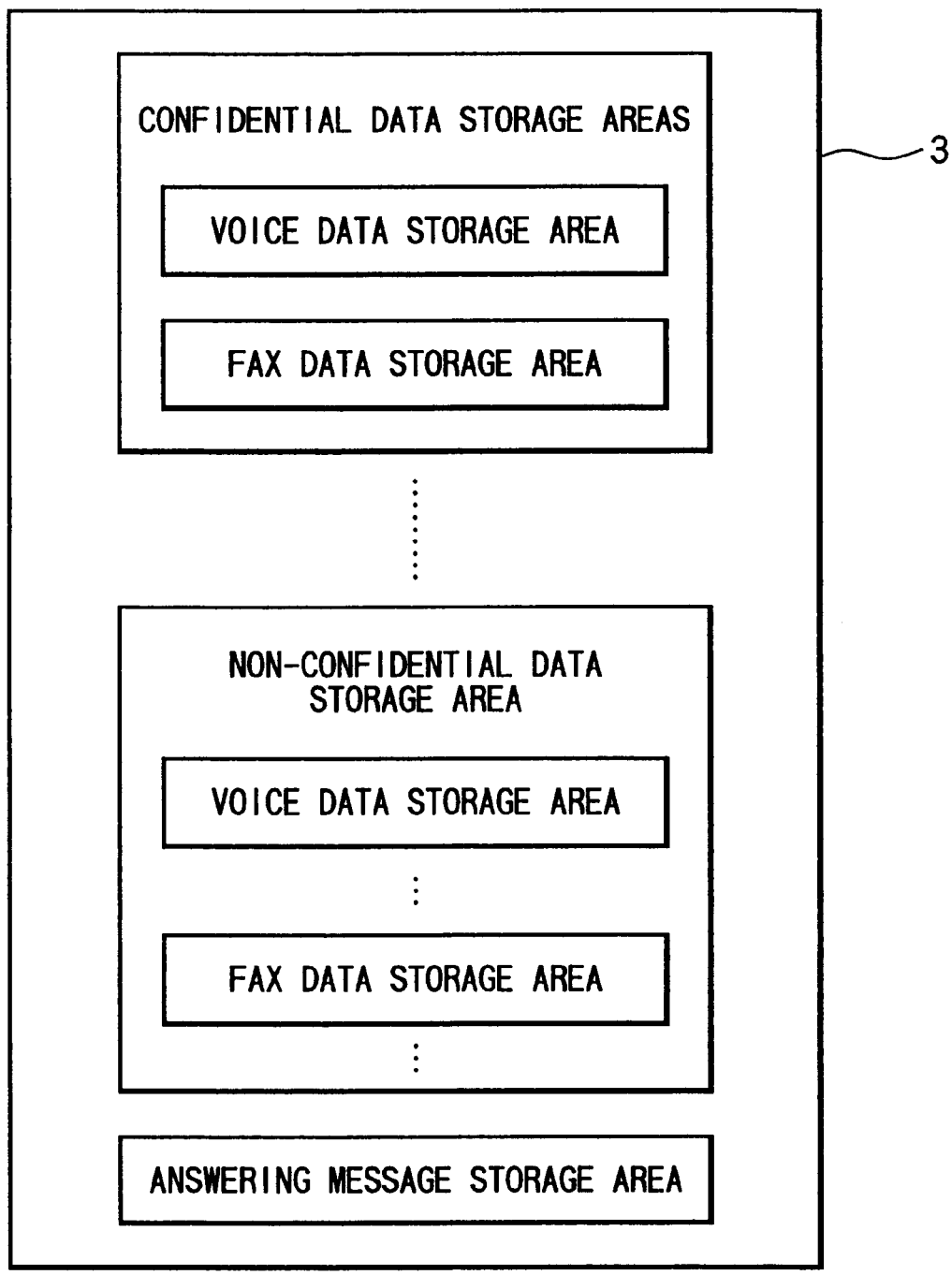
FIG. 4 is a conceptual explanatory diagram showing storage areas provided to a RAM in the facsimile device of FIG 1.

FIG. 4 is a conceptual explanatory diagram for the storage areas in the RAM 3. The RAM 3 is provided with confidential data storage areas, a non-confidential data storage area, and an answering message storage area. Of course, in addition to the above storage areas, any number of storage areas can be set in the RAM 3 to store voice data and facsimile data capable of freely being extracted from other communication terminals. For example, voice data and facsimile data for giving out various information can be stored in these storage areas in advance.

In the present embodiment, five confidential data storage areas are provided. Each of these confidential data storage areas is provided with a voice data storage area and a facsimile data storage area, both of a predetermined capacity. The memory capacities of these confidential data storage areas, including their voice data storage areas and facsimile data storage areas, are not determined individually. Instead, a flexible memory management system is employed in which storage capacity is freely allocated on a first-come first served basis. Only the overall storage space is limited to a specific capacity. Of course, it is also possible to fix storage capacities individually.

These confidential data storage areas are allocated to specific individuals to be used as their own message boxes. In other words, voice and facsimile data transmitted from another communication terminal while designating a message box number are stored in a corresponding confidential data storage area. This voice and facsimile data can only be extracted by inputting a personal identification number (PIN) or security access code equivalent to a password known only by the specific individual, that is, the owner of the confidential data storage area.

The non-confidential data storage area is provided with a predetermined number of voice data storage areas and a predetermined number of facsimile data storage areas. When the facsimile device 100 is in the answering mode, voice and facsimile data can be freely inputted from remote communication devices into this non-confidential data storage area without designating any message box number. Moreover, the stored data can be extracted without entering any security code data. Further, when a memory reception setting is set to the facsimile device 100, facsimile data can also be freely inputted from remote communication terminals. In the present embodiment, this form of non-confidential data storage area will be referred to as a general mailbox.

The answering message storage area is for storing therein voice data for outputting various voice answering messages.

Thus, the confidential data storage areas of the RAM 3 serve for storing confidential data for specific individuals, which data can be inputted from remote communication terminals via the telephone circuit 21. The CPU 1 serves as several devices according to operations performed based on programs stored in the ROM 5. That is, the CPU 1 serves as a confidential data input device for inputting confidential data for specific individuals, which data has been received from the telephone circuit 21, into the confidential data storage areas of the RAM 3. The CPU 1 also serves as a confidential data output device for reading confidential data for a specific individual from the confidential data storage areas, and outputting the data via the telephone circuit 21. The CPU 1 further serves as a confidential data input/output control device for permitting operations of the confidential data input device or the confidential data output device based on predetermined operations performed by the user onto the facsimile device 100 or predetermined information inputted via the telephone circuit 21 even when the telephone circuit 21 is connected according to the user's execution of a predetermined operation in response to calling signals inputted via the telephone circuit 21 regardless of whether the facsimile device is set in the voice/image switching mode, the manual reception mode, or the answering mode. The confidential data input/output control device permits operations of the confidential data input device or the confidential data output device also based on predetermined information transmitted to the base unit 101 from the cordless handset 16 in response to predetermined operations performed by the user onto the handset 16.

The ROM 5 serves as a storage medium for storing; a confidential data input program for inputting confidential data for specific individuals, which data has been received via the telephone circuit 21, in the confidential data storage areas of the RAM 3; a confidential data output program for reading confidential data for a specific individual from the confidential data storage areas of the RAM 3, and outputting the data via the telephone circuit 21; and a confidential data input/output control program for permitting operations according to the confidential data input program or the confidential data output program, based on the predetermined operations performed by the user on the facsimile device 100 or on the predetermined information received via the telephone circuit 21 even when the telephone circuit 21 is connected according to the user's execution of predetermined operation in response to calling signals inputted via the telephone circuit 21 regardless of whether the facsimile device is set in the voice/image switching mode, the manual reception mode, and the answering mode.

The ROM 5 also serves as a storage medium for storing: a program that operates the communication device 100 having the base unit 101 and the cordless handset 16; and a program for serving as the confidential data input device, the confidential data output device, and the confidential data input/output control device for permitting operations of the confidential data input device or the confidential data output device based on predetermined information transmitted to the base unit 101 from the handset 16 in response to the predetermined operations performed by the user on the handset 16.

Next, the operations of the facsimile device 100 configured as described above will be described in summary.

Obviously, it is possible to access the message boxes when this facsimile device is in the answering mode.

However, even when the facsimile device is set in the manual reception mode, and the user responds to the telephone ring by lifting a telephone receiver (not shown) off the hook or pushing down the speaker phone key 42, voice and facsimile data received via the telephone circuit 21 can still be inputted in the confidential data storage areas of the RAM 3 and voice and facsimile data can still be extracted from the confidential data storage areas of the RAM 3 via the telephone circuit 21 when the user performs predetermined operations on the control unit 13 of the base unit 101 or the handset 16 or when the caller performs predetermined operations onto the caller's communication device to input DTMF signals to the communication device 100 via the telephone circuit 21. It is noted that extracting voice and facsimile data from the confidential data storage areas of the RAM 3 via the telephone circuit 21 requires that a password be inputted as DTMF signals. Passwords are previously determined for each confidential data storage area to prevent fraudulent accessing of data.

If, for example, Mr. A calls, from a remote communication device, the present facsimile device 100 to input a message in Mr. B's message box but the facsimile device 100 is not set in the answering mode, Mr. A can store the desired message in Mr. B's message box even if Mr. C answers the telephone by the base unit 101 or the handset 16 and without having to first hang up the telephone and redial. Mr. A can accomplish this by requesting Mr. C to perform predetermined operations onto the base unit 101 or the handset 16 to store his message into Mr. B's message box, or by operating a facsimile device of Mr. A's own to transmit predetermined DTMF signals via the telephone circuit 21. Of course, the message can be a voice, or text or other type of image data.

The operations that Mr. C must perform on the control unit 13 of the base unit 101 include first pushing the private key 29, then pushing the "B" key of the box designating keys 23 to designate Mr. B's message box, and finally pushing the record key 24. These operations will turn off the speaker in the telephone receiver and any other related speakers, and Mr. C can place the telephone receiver on the hook without disconnecting the connection in the telephone circuit 21. Then, facsimile signals or voice signals inputted from Mr. A's facsimile device via the telephone circuit 21 will be stored as facsimile or voice data in the confidential data storage area of the RAM 3. corresponding to Mr. B's message box.

The operations that Mr. C must perform on the handset 16 include pushing the "0," "2," and "*" dial keys 51, among which the "2" corresponds to Mr. B's message box. These operations will not only turn off the speaker 66, but also the speaker in the telephone receiver of the base unit 101, and Mr. C can push the hang-up key 53 without disconnecting the connection in the telephone circuit 21. Then, facsimile signals or voice signals inputted from Mr. A's facsimile device via the telephone circuit 21 will be stored as facsimile or voice data in the confidential data storage area of the RAM 3 for Mr. B's message box.

Instead of Mr. C performing the above-described operations, however, Mr. A can also operate the calling facsimile device. That is, Mr. A can press the "0," "2," "*" dial keys 51, among which sequence the "2" corresponds to Mr. B's message box, which will input corresponding DTMF signals via the telephone circuit 21 to the present facsimile device 100 and create the same results as if Mr. C had executed the above-described operations. Hence, if Mr. C does not know the above-described operations, Mr. A himself can perform the operations to store his message in Mr. B's message box.

If Mr. D calls the present facsimile device 100 from outside to extract messages from his own message box but the facsimile device 100 is not set in the answering mode, Mr. D can still extract the data from his message box even if Mr. E answers the telephone by the base unit 101 or the handset 16 and without having to hang up the telephone and redial. Mr. D can accomplish this by requesting Mr. E to perform predetermined operations onto the base unit 101 or the handset 16 to output the messages from Mr. D's message box, or Mr. D can operate a facsimile device from which he is placing the call and transmit specified DTMF signals via the telephone circuit 21 to the present facsimile device 100. Of course, if the message is a voice message, Mr. D can listen to the message from the telephone receiver on the facsimile device from which he is calling. If the message is image data, Mr. D can have the message printed out or displayed on the facsimile device from which he is calling or displayed on a display screen.

The operations that Mr. E must perform on the control unit 13 of the base unit 101 include first pushing the private key 29, then pushing the "D" key of the box designating keys 23 to designate Mr. D's message box, and finally pushing the playback key 26. These operations will turn off the speaker in the telephone receiver and any other related speakers, and Mr. E can place the telephone receiver on the hook without disconnecting the connection in the telephone circuit 21. Then, if Mr. D inputs his own PIN by operating the dial keys on the facsimile device from which he is calling, facsimile data or voice data stored in the confidential data storage area of the RAM 3 corresponding to Mr. D's message box will be outputted as facsimile signals or voice signals via the telephone circuit 21. It is noted that Mr. D's PIN will of course be transmitted as DTMF signals from the facsimile device from which he is calling to the present facsimile device 100 via the telephone circuit 21.

The operations that Mr. E must perform on the handset 16 including pushing the "0," "4," and "*" dial keys 51, among which the "4" corresponds to Mr. D's message box. These operations will not only turn off the speaker 66, but also the speaker in the telephone receiver of the base unit 101, and Mr. E can push the hang-up key 53 without disconnecting the connection in the telephone circuit 21. Then, if Mr. D inputs his own PIN by operating the dial keys on the facsimile device from which he is calling, facsimile data or voice data stored in the confidential data storage area of the RAM 3 corresponding to Mr. D's message box will be outputted as facsimile signals or voice signals via the telephone circuit 21.

Instead of Mr. E performing the above-described operations, however, Mr. D can also operate the calling facsimile device. That is, Mr. D can press the "0," "4," "*" dial keys 51, among which sequence the "4" corresponds to Mr. D's message box, which will input corresponding DTMF signals via the telephone circuit 21 to the present facsimile device 100 and create the same results as if Mr. E had executed the above-described operations. Here as well, Mr. D himself has to input his own PIN.

It is possible to access the general mailbox when the present facsimile device 100 is in the answering mode. However, when the facsimile device 100 is set in the manual reception mode, and the user responds to the telephone ring by lifting the telephone receiver off the hook or pushing down the speaker phone key 42, voice or facsimile data inputted via the telephone circuit 21 can still be saved in the non-confidential data storage area of the RAM 3 and voice or facsimile data can still be extracted from the non-confidential data storage area of the RAM 3 via the telephone circuit 21 if the user performs predetermined operations on the base unit 101 or the handset 16 or if the caller performs predetermined operations to input DTMF signals via the telephone circuit 21.

If, for example, Mr. A calls the present facsimile device 100 to input a message in the general mailbox but the facsimile device 100 is not set in the answering mode, Mr. A can store the desired message in the general mailbox even if Mr. C answers the telephone by the base unit 101 or the handset 16 and without having to first hang up the telephone and redial. Mr. A can accomplish this by requesting Mr. C to perform predetermined operations onto the base unit 101 or the handset 16 to transmit his message into the general mailbox, or by operating a facsimile device of Mr. A's own to transmit predetermined DTMF signals via the telephone circuit 21. Of course, the message can be a voice, or text or other type of image data.

The operations that Mr. C must perform on the control unit 13 of the base unit 101 include, for example, first pushing the private key 29, then pushing the record key 24. These operations will allow Mr. C to place the telephone receiver on the hook without disconnecting the connection in the telephone circuit 21. Then, facsimile signals or voice signals inputted from Mr. A's facsimile device via the telephone circuit 21 will be stored as facsimile or voice data in the non-confidential data storage area of the RAM 3 corresponding to the general mailbox.

The operations that Mr. C must perform on the handset 16 include, for example, pushing the "0" and "*" dial keys 51. These operations will allow Mr. C to push the hang-up key 53 without disconnecting the connection in the telephone circuit 21. Then, facsimile signals or voice signals inputted from Mr. A's facsimile device via the telephone circuit 21 will be stored as facsimile or voice data in the non-confidential data storage area of the RAM 3 corresponding to the general mailbox.

Instead of Mr. C performing the above-described operations, however, Mr. A can also operate the calling facsimile device. That is, Mr. A can press the "0" and the "*" dial keys 51, which will input corresponding DTMF signals via the telephone circuit 21 to the present facsimile device 100 and create the same results as if Mr. C had executed the above-described operations.

If Mr. D calls the present facsimile device 100 from outside to extract messages from the general mailbox but the facsimile device 100 is not set in the answering mode, Mr. D can still extract the data from his message box even if Mr. E answers the telephone by the base unit 101 or the handset 16 and without having to hang up the telephone and redial. Mr. D can accomplish this by requesting Mr. E to perform predetermined operations onto the base unit 101 or the handset 16 to output the messages from the general mailbox, or Mr. D can operate a facsimile device from which he is placing the call and transmit specified DTMF signals via the telephone circuit 21. Of course, if the message is a voice message, Mr. D can listen to the message from the telephone receiver on the facsimile device from which he is calling. If the message is image data, Mr. D can have the message printed out or displayed on the facsimile device from which he is calling or displayed on a display screen.

The operations that Mr. E. must perform on the control unit 13 of the base unit 101 include, for example, pushing the private key 29 and then pushing the playback key 26. These operations will allow Mr. E to place the telephone receiver on the hook without disconnecting the connection in the telephone circuit 21. Then, facsimile data or voice data stored in the non-confidential data storage area of the RAM 3 corresponding to the general mailbox will be outputted as facsimile signals or voice signals via the telephone circuit 21.

The operations that Mr. E must perform on the handset 16 include, for example, pushing the "0" and "*" dial keys 51. These operations will allow Mr. E to push the hang-up key 53 without disconnecting the connection in the telephone circuit 21. Then, facsimile data or voice data stored in the non-confidential data storage area of the RAM 3 corresponding to the general mailbox will be outputted as facsimile signals or voice signals via the telephone circuit 21.

Instead of Mr. E performing the above-described operations, however, Mr. D can also operate the calling facsimile device. That is, Mr. D can press the "0" and "*" dial keys 51, which will input corresponding DTMF signals via the telephone circuit 21 to the present facsimile device 100 and create the same results as if Mr. E had executed the above-described operations.

Hence, other than not performing an operation to designate the message box number, the general mailbox can be accessed using exactly the same operations as those used for accessing a specific individual's message box.

Next, the sequence of processes for incoming transmissions will be described in greater detail for the various operating modes with reference to the flowcharts in FIGS. 5–10.

Figure 5:
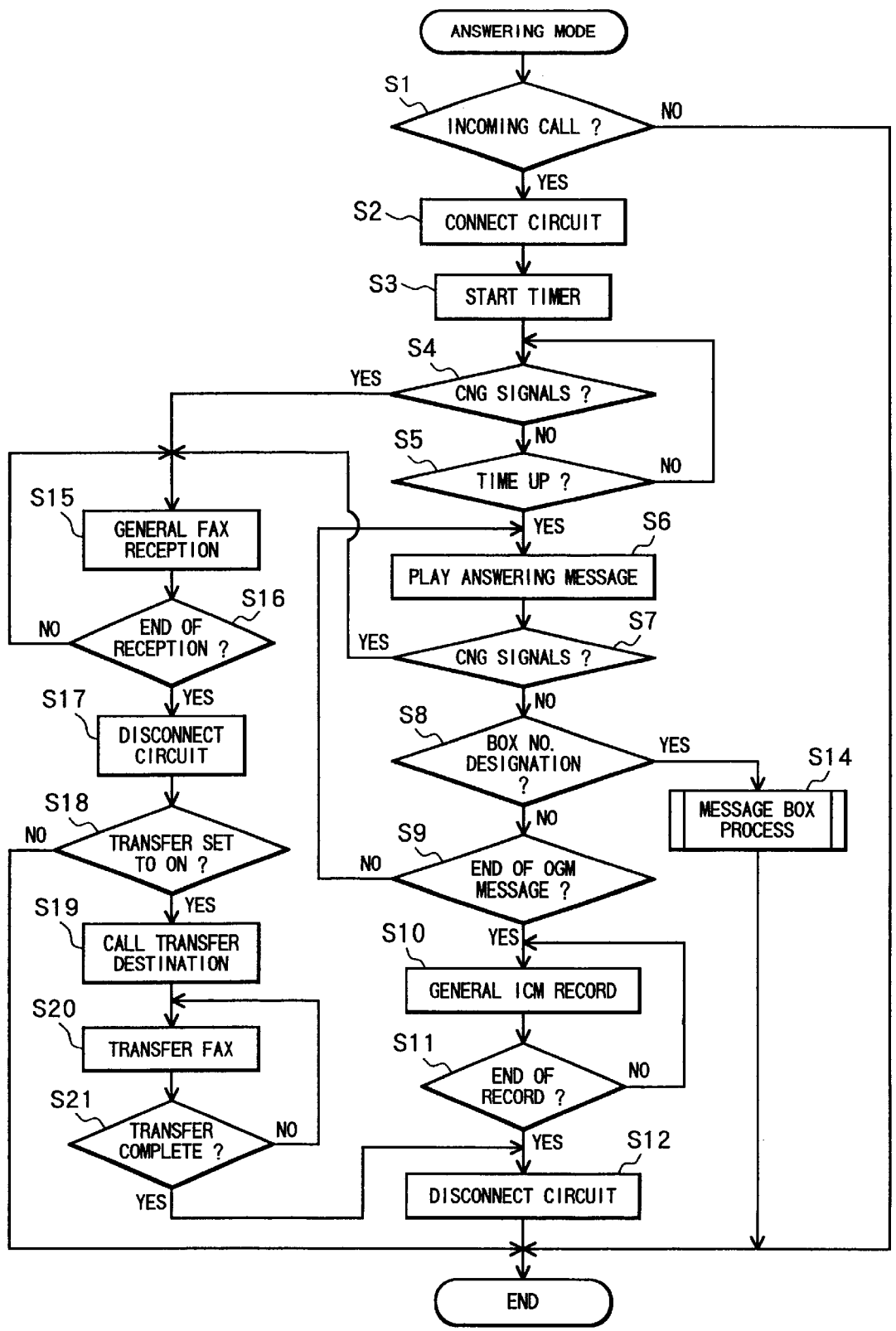
FIG. 5 is a flowchart explaining a process for handling incoming messages in an answering mode, according to the facsimile device of FIG. 1.

At the beginning of the processes in the answering mode, as shown in FIG. 5, the CPU 1 determines the existence of an incoming call in S1. When an incoming call exists ("yes" in S1), the CPU 1 controls the NCU 2 to connect the circuit 21 and receive the incoming call in S2. When a message box setting is set to ON at this time, the incoming call is received silently without ringing a telephone bell, regardless of the number of rings set for the ball. When the message box setting is set to OFF, on the other hand, the incoming call is received audibly by ringing the telephone bell according to the number of rings set for the bell. The sound of the bell ring is outputted also from the speaker 66 of the handset 16. It is noted that when the message box setting is set to OFF, the message box cannot be accessed at all. Next, the CPU 1 starts the timer in S3. This timer establishes the time, such as four seconds, for attempting to detect CNG signals from the originating terminal. Accordingly, the CPU 1 determines whether CNG signals have been detected in S4. In other words, the CPU 1 attempts to determine whether CNG signals have been inputted via the telephone circuit 21.

When CNG signals are not detected ("no" in S4), the CPU 1 determines in S5 whether the time set by the timer in S3 has elapsed. When the time has elapsed ("yes" in S5), indicating that CNG signals were not inputted during the prescribed time and, therefore, that signals are not being received from a facsimile device, the CPU 1 begins in S6 playing an outgoing message (OGM) recorded for the answering mode. The OGM is a guide message for informing the caller that the present facsimile device 100 is now in the answering mode. More specifically, voice data corresponding to the answering mode OGM is read from the answering message storage area in the RAM 3, converted into voice signals by the codec 8, and sent by the NCU 2 via the telephone circuit 21. Then, the CPU 1 attempts again in S7 to detect the existence of CNG signals.

When no CNG signals are detected ("no" in S7), the CPU 1 determines in S8 whether a message box number is designated. In other words, if dial keys were pressed on the originating communication device in order to designate a message box number, DTMF (dual tone multiple frequency) signals corresponding to those dial keys would be transmitted to the present facsimile device 100 via the telephone circuit 21. Therefore, the CPU 1 determines whether such DTMF signals have been inputted. The A–E box designating keys 23 of the present facsimile device 100 each correspond to one of the message boxes. Further, each of the message boxes correspond to one of the dial keys, such as 1–5, on the originating communication device. Therefore, instead of pushing one of the A–E box designating keys 23 on the present facsimile device 100, the caller can designate a desired message box by pressing one of the dial keys 1–5 on the originating terminal. For example, instead of pressing the A box designating key 23, the caller can press the "0", "1," and "*" dial key sequence on the originating terminal.

When no box number has been designated ("no" in S8), the CPU 1 determines in S9 whether the answering mode OGM started in S6 has ended. When the answering mode OGM has ended ("yes" in S9), then it is determined that no CNG signals have been detected during the period of the OGM playback and, moreover, no message box numbers have been designated. This is because detection of CNG signals and of DTMF signals for designating message box numbers is always performed during playback of the answering mode OGM. That is, the period of the OGM playback is always constructed of the time for sending out the answering mode OGM, followed by a period of silence. During this time, attempts are made to detect CNG and DTMF signals. In this case, no signals have been detected, and therefore it is determined that the caller wishes to input a voice message to or output a voice message from a general mail box. Therefore, the CPU 1 performs in S10 a general incoming message (ICM) record operation for storing incoming message as non-confidential data. More specifically, voice signals inputted via the telephone circuit 21 are converted to digital voice data by the codec 8, and that voice data is stored in the voice data storage areas within the non-confidential data storage area of the RAM 3.

During the record operation, the CPU 1 periodically determines whether the recording has been completed in S11. When the general ICM record has been completed ("yes" in S11), the CPU 1 disconnects the circuit 21 in S12, and the current routine ends. However, when the general ICM record has not been completed ("no" in S11), this process in S10 is continued.

In S9, if playback of the OGM for the answering mode has not yet been completed ("no" in S9), the processes are repeated beginning from S6, where playback of the OGM is continued.

In S8, if a message box number is designated ("yes" in S8), indicating that the caller wishes to input a message into or output a message from a message box for a specific individual, then a message box process in S14 is executed and the current routine ends. The message box process of S14 will be described later.

In S7, if CNG signals are detected ("yes" in S7), indicating that a facsimile not intended for any specific individual is being received, the CPU 1 performs in S15 a general facsimile reception for receiving incoming facsimile as non-confidential data. Specifically, facsimile data is received via the telephone circuit 21 and stored in the facsimile data storage areas within the non-confidential data storage area of the RAM 3. Then, the CPU 1 determines in S16 whether reception of the general facsimile has been completed. If the reception has been completed ("yes" in S16), the CPU 1 disconnects the circuit in S17 and determines in S18 whether a facsimile transfer setting is set to ON. When the transfer setting is set to ON ("yes" in S18), the CPU 1 issues in S19 a call to a communication terminal to which facsimile data should be transferred, and transmits in S20 the facsimile data received in S15. In other words, the facsimile device 100, which is set in the answering mode, stores the received facsimile data in the facsimile data storage areas within the non-confidential data storage area of the RAM 3, and then transfers that facsimile data to the communication terminal at a previously set telephone number. Next, the CPU 1 determines whether the transfer operation has been completed in S21. If the transfer has completed ("yes" in S21), the circuit is disconnected in S12, and the current routine ends.

In S21, if the transfer has not yet been completed ("no" in S21), then the transfer is continued in S20. In S18, if the transfer setting is not set to ON ("no" in S18), then there is no need to transfer data, and the current routine ends. In S16, if the general facsimile reception has not yet been completed ("no" in S16), then the reception is continued in S15. In S5, if the time for the timer started in S3 has not yet been elapsed ("no" in S5), then another attempt is made to detect CNG signals in S4. In S4, if CNG signals are detected ("yes" in S4), indicating that the originating terminal is performing an automatic facsimile transmission, the general facsimile reception process beginning from S15 is executed. In S1, if the CPU 1 determines that no incoming calls exist ("no" in S1), then the current routine ends.

Next, the message box process in S14 will be described.

Figure 6:
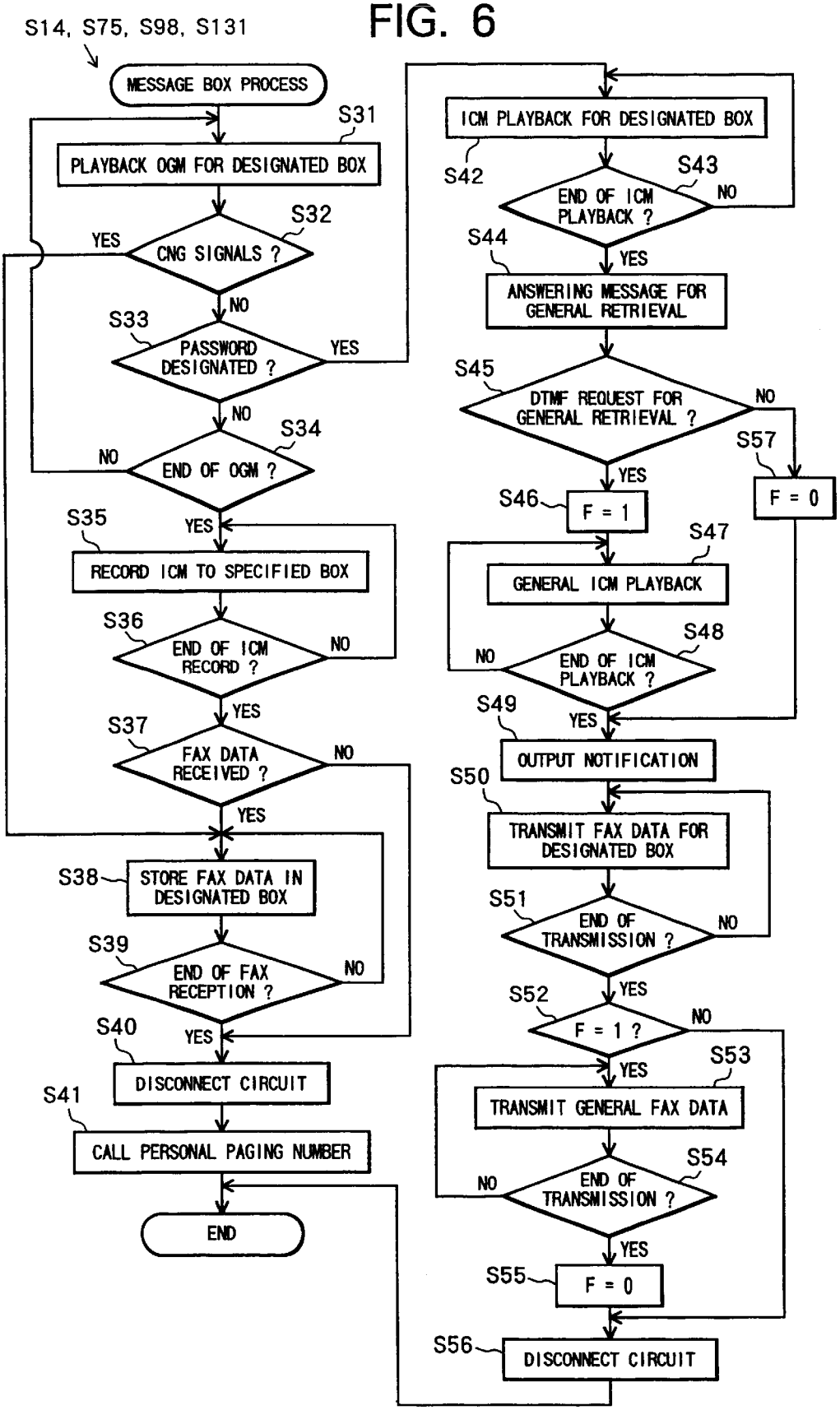
FIG. 6 is a flowchart explaining in detail a message box process performed in the flowchart of FIG. 5.

A the beginning of the message box process, as shown in FIG. 6, the CPU 1 starts in S31 playing an OGM for the message box indicated by the DTMF signals. The OGM for the message box is a guide message informing the caller that the message box process will be performed thereafter for the caller's designated message box. More specifically, voice data corresponding to the OGM for the designated message box is read from the answering message storage area of the RAM 3, converted into voice signals by the codec 8, and sent as voice signals via the telephone circuit 21 to the originating terminal. At this time, sound output is discontinued from all speakers, including the speaker in the telephone receiver of the base unit 101, all other speakers related to the base unit 101, and the speaker 65 in the handset 16.

Then, the CPU 1 determines in S32 whether CNG signals are detected. That is, the CPU 1 checks whether CNG signals are received via the telephone circuit 21. When CNG signals are not detected ("no" in S32), then the CPU 1 determines in S33 whether a password is designated, that is, whether a PIN corresponding to the designated message box is correctly entered as DTMF signals. This precaution is provided to prevent someone who does not know the PIN from fraudulently accessing data in the message box. If any password is not designated ("no" in S33), then the CPU 1 determines in S34 whether playback of the OGM for the message box designated by the DTMF signals has been completed.

When playback of the OGM is ended ("yes" in S34), it is determined that no CNG signals and no DTMF signals corresponding to a password have been detected during the period of the OGM playback. Hence, it is determined that the caller wishes to input a voice message for input into the designated message box. Therefore, the CPU 1 starts in ICM record operation for recording the caller's messages into the designated message box in S35. More specifically, voice signals inputted via the telephone circuit 21 is converted to digital voice data by the codec 8, and that voice data is stored in the voice data storage area within the confidential data storage area corresponding to the designated message box.

The CPU 1 determines in S36 whether the ICM record operation has been completed. When the ICM record operation is completed ("yes" in S36), the CPU 1 determines in S37 whether facsimile data has been received. When facsimile data has been received ("yes" in S347), the CPU 1 stores the received facsimile data in the designated message box in S38. More specifically, the received facsimile data is demodulated by the modem 4, and the demodulated data is stored in the facsimile data storage area of the confidential data storage area corresponding to the designated message box.

Then, the CPU 1 determines in S39 whether reception of the facsimile data is completed. When reception of the data is completed ("yes" in S39), the CPU 1 disconnects the circuit in S40. Then, when a personal paging setting is set to ON, then a call is issued to the number for at least one personal communication terminal (such as a paper) corresponding to the designated mail box in S41, and the current routine ends. However, when the personal paging setting is set to OFF, then no call is issued.

It is noted that the personal paging number is a telephone number of a communication terminal owned by a specific individual for the designated mail box. A call is issued to this number via the telephone circuit 21 to notify the owner (specific individual) of the message box that a message has just been inputted into his/her message box. Each message box is stored with data of one or more personal paging numbers corresponding to one or more communication terminals owned by the specific individual. Accordingly, when a message is inputted into a message box, a call is issued to the paging phone numbers corresponding to that message box to automatically notify the owner. The method of notification can be, for example, to display characters or symbols on a display screen of the communication terminal, such as a pager, a facsimile device, or a telephone device, indicating that a message has been received in the message box. It is also possible to not simply indicate that a message has been received, but transmit the actual message itself. Of course, if the latter method is used, the communication terminal at the transmission destination must be capable of receiving such a message. For example, a facsimile message cannot be transmitted when the communication terminal at the transmission destination is a pager or a telephone device having no facsimile reception functions.

In S39, if reception of the facsimile data has not yet been completed ("no" in S39), then facsimile data continues to be received in S38. In S37, if facsimile data is not received ("no" in S37), then there is no need to store facsimile data in the message box, and the processes beginning from S40 are executed. In S36, if the ICM record has not yet been completed ("no" in S36), the ICM record operation is continued in S35. In S34, if playback of the OGM for the message box designated by the DTMF signals has not yet been completed ("no" in S34), then playback of the OGM is continued in S31.

In S33, if a password has been designated ("yes" in S33), that is, if DTMF signals corresponding to the PIN for the designated message box has been inputted, then the CPU 1 performs in S42 an ICM playback for the designated message box. More specifically, voice data (incoming messages) stored in the confidential data storage area for the designated message box is read out, converted into analog voice signals by the codec 8, and sent by the NCU 2 via the telephone circuit 21.

The CPU 1 then judges in S43 whether the ICM playback for the designated message box has been completed. When the ICM playback has been completed ("yes" in S43), the CPU 1 performs in S44 a playback of an outgoing message (OGM) for general retrieval. More specifically, voice data corresponding to the OGM for general retrieval is read from the answering message storage area in the RAM 3, converted into analog voice signals by the codec 8, and sent by the NCU 2 via the telephone circuit 21. This message is used for confirming whether the caller wishes to perform a general retrieval for retrieving messages from the general mailbox, as well as from the caller's message box.

Then, the CPU 1 determines in S45 whether DTMF signals predetermined to signify a request for general retrieval is inputted. When such DTMF signals have been inputted within a predetermined time period after the start of the playback of the general retrieval OGM ("yes" in S45), then the CPU 1 sets a flag F to 1 in S46 and starts a general ICM playback in S47. More specifically, voice data stored in the voice data storage areas within the non-confidential data storage area of the RAM 3 is read, converted into analog voice signals by the codec 8, and sent by the NCU 2 via the telephone circuit 21.

Next, the CPU 1 determines the S48 whether the general ICM playback has been completed. When the general ICM playback has been completed ("yes" in S48), then the CPU 1 outputs a facsimile message notification sound in S49. More specifically, the CPU 1 reads out, from the answering message storage area of the RAM 3, voice data equivalent to a message notifying the caller that facsimile data will be transmitted. The voice data is then converted to analog voice signals by the codec 8, and sent by the NCU 2 via the telephone circuit 21. This message informs the caller at the originating terminal to start facsimile reception by pressing a start key on the terminal.

Next, the CPU starts transmitting facsimile data from the designated message box in S50. More specifically, facsimile data stored in the facsimile data storage area in the confidential data storage area corresponding to the designated message box is modulated by the modem 4 and sent by the NCU 2 via the telephone circuit 21.

Then, the CPU 1 determines in S51 whether transmission of the facsimile data has been completed. When transmission of facsimile data has been completed ("yes" in S51), then the CPU 1 determines in S52 whether the flag F is set to 1. When the flag F is set to 1 ("yes" in S52), indicating that a request for retrieving the contents of the general mailbox has been received from the originating terminal, then the CPU 1 begins transmitting general facsimile data in S53. More specifically, facsimile data stored in the facsimile data storage areas in the non-confidential data storage area is read, modulated by the modem 4, and sent by the NCU 2 via the telephone circuit 21.

Next, the CPU 1 determines in S54 whether transmission of the non-confidential facsimile data has been completed. When the transmission has been completed ("yes" in S54), then the CPU 1 sets the flag F to 0 in S55 and disconnects the circuit in S56, and the current routine ends.

In S54, if transmission of the non-confidential facsimile data has not been completed ("no" in S54), then transmission of data is continued in S53. In S52, if the flag F is not 1 ("no" in S52), indicating that a request for the contents of the general mailbox has not been issued by the originating terminal, then transmission of the non-confidential facsimile data is skipped, and the circuit is disconnected in S56. In S51 if transmission of facsimile data from the designated message box has not been completed ("no" in S51), then transmission of the facsimile data is continued in S50. In S48, if the general ICM playback has not been completed ("no" in S48), then the general ICM playback is continued in S47. In S45, if DTMF signals predetermined to signify a general retrieval request are not inputted within the predetermined amount of time beginning from the start of the answer message for general retrieval ("no" in S45), then the CPU 1 sets the flag F to 0 in S57, skips the general ICM playback, and executes the processes beginning from S49. In S43, if the ICM playback for the designated message box has not been completed ("no" in S43), then the ICM playback is continued in S42. In S32, if CNG signals have been detected ("yes" in S32), indicating that the caller wishes only to leave a facsimile message in the designated message box, then the ICM record process is skipped, and the processes beginning from S38 are executed.

Figure 7:
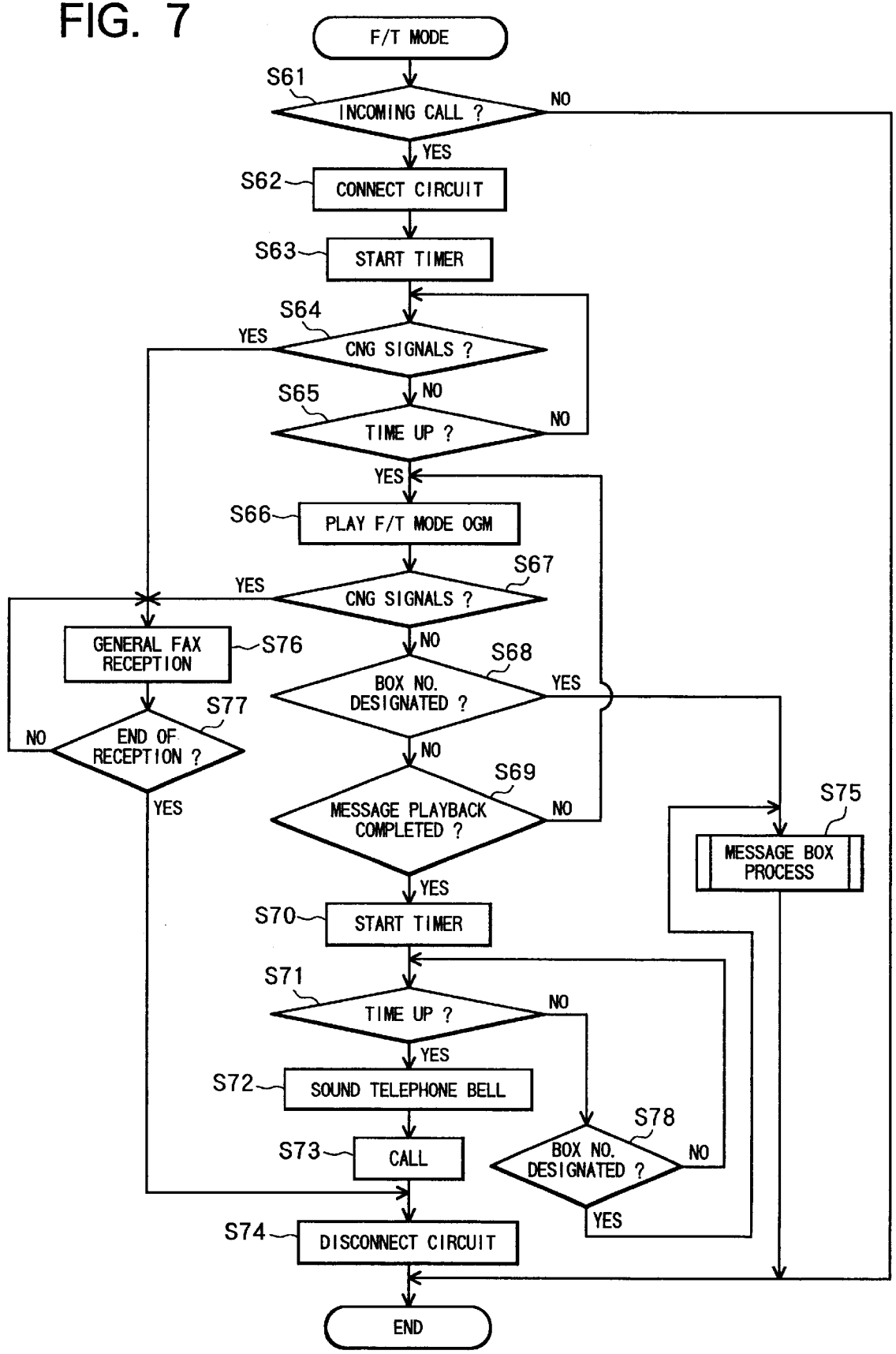
FIG. 7 is a flowchart explaining a process for handling incoming messages in a F/T mode according to the facsimile device of FIG. 1.

Next, the sequence of processes for dealing with incoming transmissions in the automatic facsimile/telephone switching mode (hereinafter referred to as the "F/T mode") will be described with reference to the flowchart in FIG. 7.

At the beginning of the processes in the F/T mode, the CPU 1 judges the existence of an incoming call in S61. When an incoming call exists ("yes" in S61), the CPU 1 controls the NCU 2 to close the connection circuit 21 and receive the call in S62. If the message box setting is set to ON at this time, the incoming call is received silently without ringing the telephone bell, regardless of the number of rings set for the bell. If the message box setting is set to OFF, on the other hand, the incoming call is received audibly by ringing the telephone bell according to the number of rings set for the bell. The sound of the bell ring is outputted also from the speaker 66 of the handset 16. Next, the CPU 1 starts the timer in S63. This timer establishes the time, such as four seconds, for attempting to detect CNG signals from the originating terminal. Then, the CPU 1 determines whether CNG signals are detected in S64. In other words, the CPU 1 attempts to determine whether CNG signals have been inputted via the telephone circuit 21.

If CNG signals are not detected ("no" in S64), the CPU 1 determines in S64 whether the time set by the timer in S63 has elapsed. When the time has elapsed ("yes" in S64), indicating that CNG signals have not been inputted during the predetermined time and, therefore, it is determined that signals are not being received from a facsimile device, the CPU 1 starts in S66 playing an outgoing message (F/T-OGM) recorded for the F/T mode. The F/T-OGM is a guide message for informing the caller that the present facsimile machine 100 is in the F/T mode. More specifically, voice data corresponding to the F/T-OGM is read from the answering message storage area in the RAM 3, converted into voice signals by the codec 8, and sent by the NCU 2 via the telephone circuit 21.

Then, the CPU 1 attempts again in S67 to detect the existence of CNG signals. If no CNG signals are detected ("no" in S67), the CPU 1 determines in S68 whether a message box number is designated. In other words, when dial keys were pressed on the originating terminal in order to designate a message box number, DTMF signals corresponding to those dial keys would be inputted via the telephone circuit 21. Therefore, the CPU 1 determines whether such DTMF signals have been inputted.

If no box number is designated ("no" in S68), the CPU 1 determines in S69 whether playback of the F/T-OGM started in S66 has been ended. When playback of the F/T mode message has ended ("yes" in S69), then the CPU 1 starts a timer in S70 and determines whether the time set for that timer has elapsed in S71. Contrary to the timer started in S63, this timer provides the caller with time to designate a message box number after playback of the F/T mode message has been completed. The timer is set for about 2 seconds, for example.

If the time for the timer set in S70 has elapsed ("yes" in S71), the CPU 1 sounds the telephone bell in S72. A call is achieved in S73 if the user responds to the telephone bell by taking the telephone receiver of the base unit 101 off hook, by pushing the speaker phone key 42, or by pushing the external line key 52 on the handset 16. After the call has been completed, the CPU 1 disconnects the circuit in S74, and the current routine ends.

In S71, if the time set for the timer in S70 has not elapsed ("no" in S71), then the CPU 1 determines whether a box number has been designated in S78. If a box number has been designated ("yes" in S78), then the message box process of FIG. 6 is executed in S75. If a box number has not been designated ("no" in S78), then the processes beginning from S71 are repeated until either the time elapses or a box number is designated. In S69, if playback of the F/T mode message has not been completed ("no" in S69), then playback of the message is continued in S66. In S68, if a box number has been designated ("yes" in S68), indicating that the caller wishes to input a message to or output a message from a message box for a specific individual, then the message box process of FIG. 6 is executed in S75, and the current routine ends.

In S67, if CNG signals are detected ("yes" in S67), indicating that a facsimile not intended for any specific individual is being received, the CPU 1 performs a general facsimile reception in S76 to receive facsimile data as non-confidential data. Specifically, when a memory reception setting has been set, facsimile data is received via the telephone circuit 21 and stored in the facsimile data storage areas within the non-confidential data storage area of the RAM 3. When memory reception setting has not been set, the facsimile data received via the telephone circuit 21 is recorded by the recording unit 12 onto recording paper.

Then, the CPU 1 determines in S77 whether reception of the non-confidential facsimile data has been completed. When reception of the facsimile has been completed ("yes" ins" in S77), then the CPU 1 disconnects the circuit in S74, and the current routine ends. In S77, if reception of the facsimile has not been completed ("no" in S77), then reception is continued in S76. In S65, if the time set for the timer in S63 has not been elapsed ("no" in S65), then attempts to detect CNG signals are continued in S64. In S64, if CNG signals have been detected ("yes" in S64), indicating that the facsimile device at the originating terminal is performing an automatic facsimile transmission, then the general facsimile reception process for receiving non-confidential facsimile data is executed beginning from S76. In S61, if the CPU 1 does not detect an incoming call ("no" in S61), then the current routine ends.

It is noted that during the call process of S73 in both the F/T mode and the manual reception mode described later, the message box process can be executed when the user operates the box designating keys 23 and when the caller operates dial keys at the originating terminal.

Figure 8:
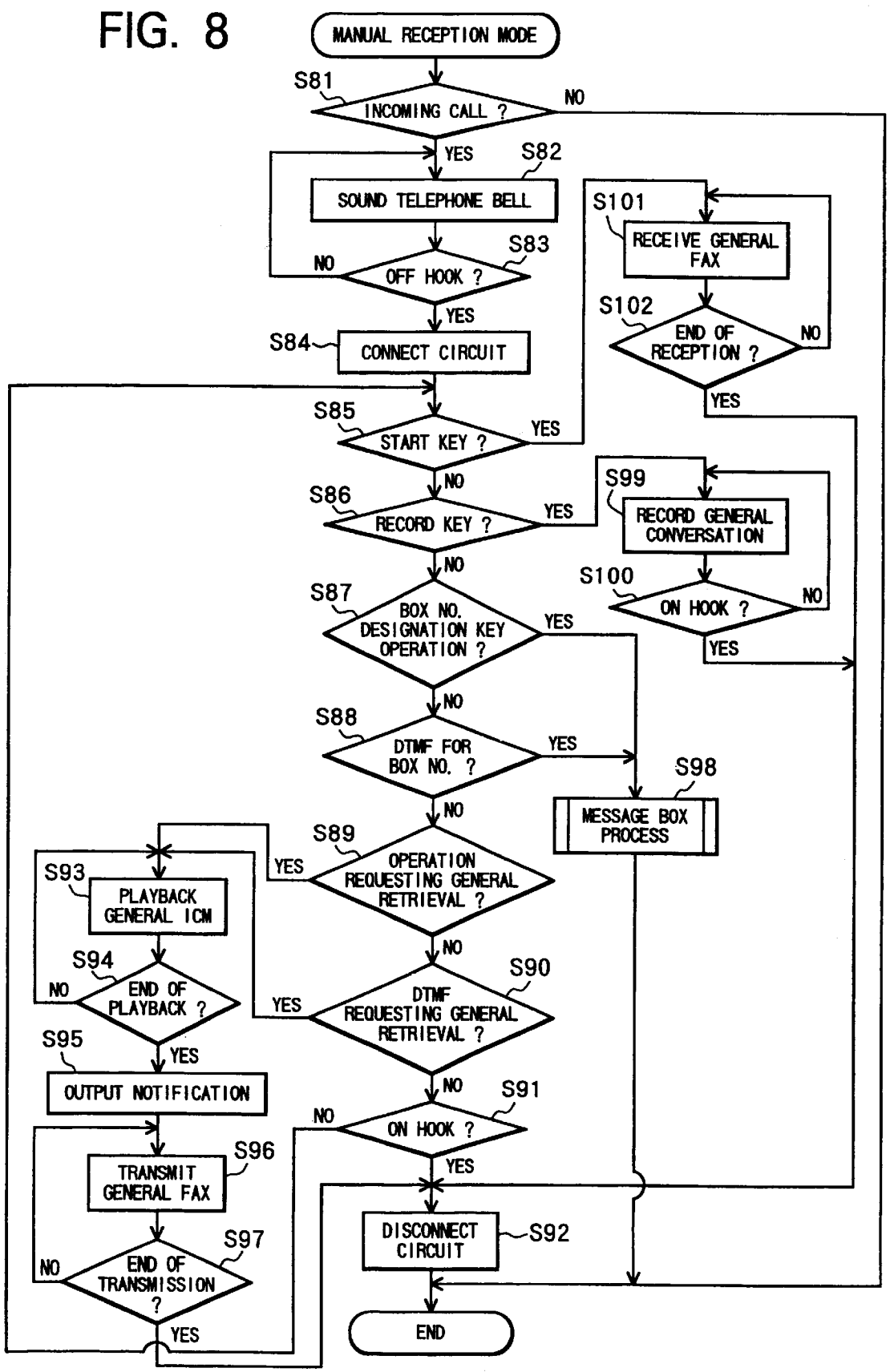
FIG. 8 is a flowchart explaining a process for handling incoming messages in a manual reception mode according to the facsimile device of FIG. 1.

Next, the sequence of processes performed to handle and incoming call in the manual reception mode will be described with reference to FIG. 8.

At the beginning of the manual reception mode, the CPU 1 determines the existence of an incoming call in S81. When an incoming call exists ("yes" in S81), then the CPU 1 sounds the telephone bell in S82. Next, the CPU 1 determines in S83 whether a telephone has been taken off hook, that is, whether the user has taken the telephone receiver for the base unit 101 off the hook or has pushed the speaker phone key 42. If the telephone has been taken off hook ("yes" in S83), then the CPU 1 controls the NCU 2 to connect the circuit to accept the incoming call in S84.

When the caller merely wishes to transmit a facsimile and has no desire to use the message boxes or general mailbox, the caller informs the user at the present facsimile device 100 that the caller wishes the only transmit facsimile data. In this case, the user of the present facsimile device 100 would press the start key 33 on the base unit 101. Accordingly, the CPU 1 determines in S85 whether the start key 33 has been pressed.

If the start key 33 has not been pressed ("no" in S85), then the CPU 1 determines whether the record key 24 has been pressed in S86, indicating that the user of the present facsimile device 100 wishes to record a call. When the record key 24 has not been pressed ("no" in S86), the CPU 1 determines in S87 whether key operations have been performed to designate a message box number. In other words, if the caller informs the user of the present facsimile device 100 that the caller wishes to enter a message in a message box during a call, the user of the present facsimile device 100 responds by performing operations required to input the caller's message into one of the message boxes A–E. Therefore, the CPU 1 determines whether these operations have been made. More specifically, the CPU 1 checks whether the private key 29, one of the box designating keys 23, and the record key 24 have been pressed in this sequence. Of course, this sequence is not limited to this order and can be in another predetermined order.

When the key operations designating a message box number have not been performed ("no" in S87), then the CPU 1 determines in S88 whether DTMF signals designating a box number have been detected. In other words, when the caller wishes to enter a message in a message box, the caller can push dial keys on the originating terminal to designate the message box number without requesting the user of the present facsimile 100 to perform the above-described operations. This dial key operation is the same as that performed by the caller to designate the message box when the present device 100 is in the answering mode and in the F/T mode. When the caller performs this dial key operation, DTMF signals corresponding to the dial keys are inputted via the telephone circuit 21. The CPU 1 therefore checks for these DTMF signals.

When DTMF signals designating a box number are not detected ("no" in S88), then the CPU 1 determines in S89 whether key operations for requesting a general retrieval have been performed. In other words, when the caller wishes to insert a message into the general mailbox rather than into the message box of a specific individual, the caller informs the user of the present facsimile device 100 this desire during the call. In this case, the user of the present facsimile device 100 performs key operations required to input the caller's message into the general mailbox. Hence, the CPU 1 checks for these operations performed by the user. More specifically, the CPU 1 checks whether the private key 29 and the record key 24, in this sequence, have been pressed. Of course, the key sequence is not limited to this order, but can be in any predetermined order.

When key operations for requesting the general retrieval have not been performed ("no" in S89), then the CPU 1 determines in S90 whether DTMF signals for requesting the general retrieval have been detected. In other words, when the caller wishes to insert a message into the general mailbox, without requesting the user of the present facsimile device to perform the above-described operation, the caller pushes dial keys on the originating terminal, causing DTMF signals corresponding to these dial keys to be inputted via the telephone circuit 21. Hence, the CPU 1 determines whether such DTMF signals have been inputted. The dial keys pressed to perform this operation must be predetermined to be distinguishable from dial keys for designating a message box number.

When DTMF signals for requesting the general retrieval have not been detected ("no" in S90), then the CPU 1 determines in S91 whether the user's telephone has been placed on hook, that is, whether the user has placed the telephone receiver of the base unit 101 on the hook, has pushed the speaker phone key 42, or has pushed the external line key 52 of the handler 16. When the telephone has been placed on hook ("yes" in S91), then the CPU 1 controls the NCU 2 to disconnect the circuit in S92, and the current routine ends. However, when in S91 the telephone has not been placed on hook ("no" in S91), then the call is continued from S85.

In S90, if DTMF signals for requesting the general retrieval have been detected ("yes" in S90), then the CPU 1 starts a general ICM playback in S93. More specifically, voice data stored in the voice data storage areas within the non-confidential data storage area of the RAM 3 is read, converted into analog voice signals by the codec 8, and sent by the NCU 2 via the telephone circuit 21.

Next, the CPU 1 determines in S94 whether the general ICM playback has been completed. When the general ICM playback has been completed ("yes" in S94), then the CPU 1 outputs a facsimile message notification sound in S95. More specifically, the CPU 1 reads, from the answering message storage area of the RAM 3, voice data equivalent to a message notifying the caller that facsimile data will be transmitted. The voice data is then converted to analog voice signals by the codec 8, and sent by the NCU 2 via the telephone circuit 21. This message informs the caller at the originating terminal to begin facsimile reception by pressing the start key on the terminal.

Next, the CPU 1 begins transmitting facsimile data from the general mailbox in S96. More specifically, facsimile data stored in the facsimile data storage areas of the non-confidential data storage area (general mailbox) is read, modulated by the modem 4, and sent by the NCU 2 via the telephone circuit 21.

Then, the CPU 1 determines in S97 whether transmission of the facsimile data of the general mailbox has been completed. When transmission of the data has been completed ("yes" in S97), then the circuit is disconnected in S92, and the current routine ends.

In S97, if transmission of the non-confidential facsimile data has not been completed ("no" in S97), then transmission of the facsimile data continues in S96. In S94, if playback of the general ICM has not been completed ("no" in S94), then playback of the general ICM continues in S93. In S89, if the key operations requesting the general retrieval have been detected ("yes" in S89), then the processes beginning with the general ICM playback in S93 are executed. In S88, if DTMF signals designating a box number have been detected ("yes" in S88), indicating a request to access the message box of a specific individual, then the CPU 1 executes the message box process of S98 as shown in FIG. 6, and the current routine ends. In S87, if key operations designating a message box number have been performed ("yes" in S87), indicating a request to access the message box of a specific individual, then the CPU 1 executes the message box process of S98 as shown in FIG. 6.

In S86, if the record key 24 has been pressed ("yes" in S86), then the CPU 1 performs a general conversation record in S99. In other words, voice signals inputted from the originating terminal via the telephone circuit 21 and voice signals from a microphone in the user's telephone receiver are converted into digital voice data by the codec 8 and stored in the RAM 3. This voice data is not a message and, therefore, is not stored in a confidential data storage area or the non-confidential data storage area, but is stored in an additional specified area in the RAM 3.

Next, the CPU 1 determines whether the user's telephone is on hook in S100, that is, whether the user has placed the telephone receiver of the base unit 101 on the hook, has pressed the speaker phone key 42, or has pressed the external line key 52 of the handset 16. When the telephone is on hook ("yes" in S100), then the circuit is disconnected in S92, and the current routine ends. However, if in S100 the telephone is not on hook ("no" in S100), then the general conversation record is continued in S99.

In S85, if the start key has been pressed ("yes" in S85), indicating that a facsimile not intended for a specific individual is being received, the CPU 1 performs in S101 a general facsimile reception for receiving facsimile data as non-confidential data. Specifically, when the memory reception setting has been set, facsimile data is received via the telephone circuit 21 and stored in the facsimile data storage areas within the non-confidential data storage area of the RAM 3. When the memory reception setting has not been set, then facsimile data received via the telephone circuit 21 is recorded by the recording unit 12 onto recording paper. Then, the CPU 1 determines in S102 whether the general reception of facsimile has been completed. When the reception has been completed ("yes" in S102), the CPU 1 disconnects the circuit in S92, and the current process ends. However, when the general facsimile reception has not been completed ("no" in S102), then the general facsimile reception is continued in S101.

In S83, if the telephone has not been taken off the hook ("no" in S83), then the CPU 1 continues to sound the telephone bell in S82. In S81, if the CPU 1 determines that an incoming cell does not exist ("no") in S81), then the current process ends.

Figure 9:
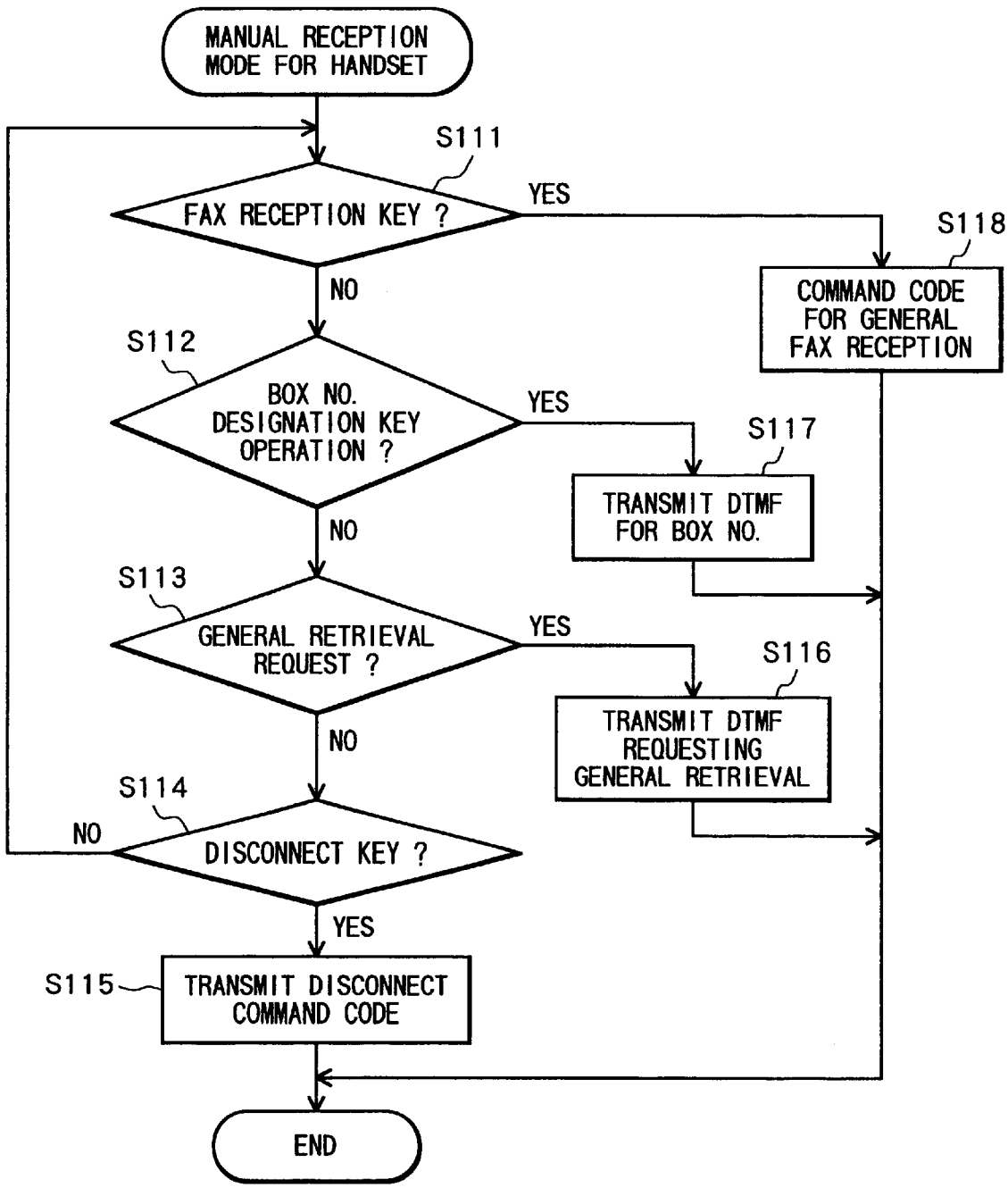
FIG. 9 is a flowchart explaining a process for handling incoming messages in a manual reception mode of a handset according to the facsimile device of FIG. 1.
Figure 10:
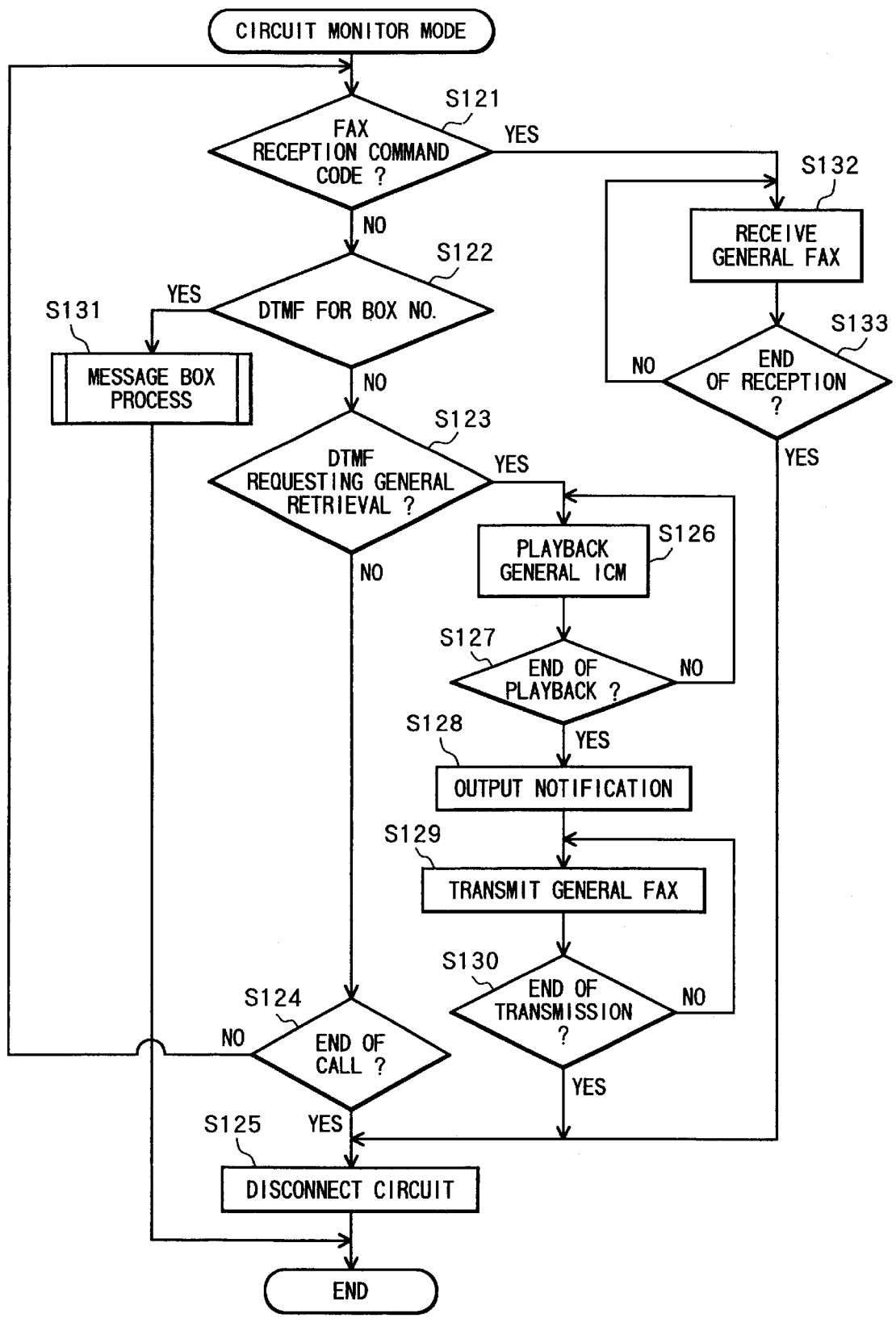
FIG. 10 is a flowchart explaining a process for handling incoming messages in a circuit monitor mode according to the facsimile device of FIG. 1.
Figure 11:
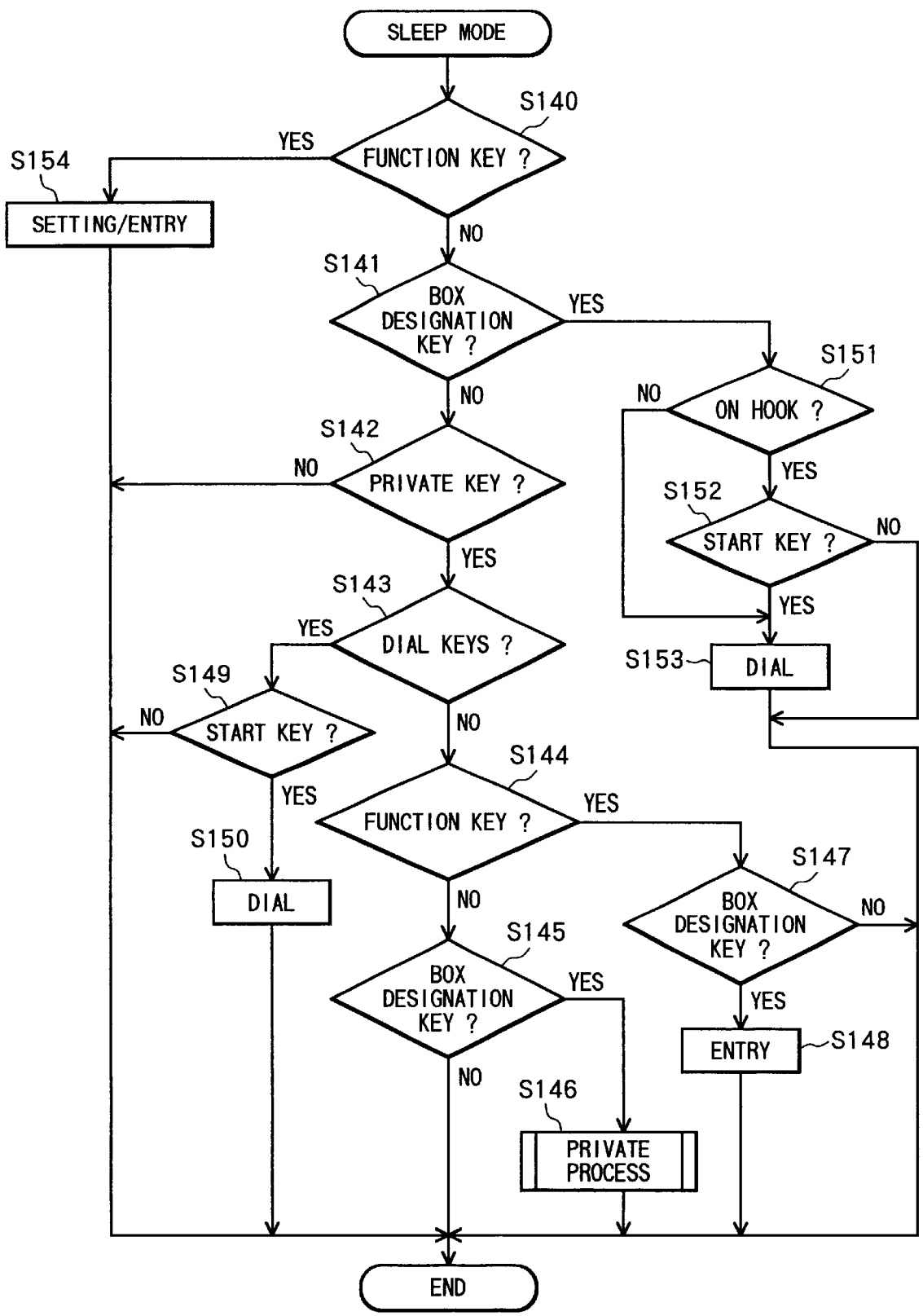
FIG. 11 is a flowchart explaining various processes in a sleep mode according to the facsimile device of FIG. 1.

Next, the operations of a handset manual reception mode for the handset 16 will be described with reference to FIG. 9. The handset 16 performs this operation when the handset 16 is used to receive a call in the manual reception mode.

At the beginning of the processes in this handset manual reception mode, the CPU (not shown) provided in the handset 16 determines whether the facsimile reception key 60 has been processed in S111. In other words, when the caller wishes to transfer a facsimile not intended for a specific individual, the caller informs his or her request to the user of the handset 16 during the call, and the user pushes the facsimile reception key 60 on the handset 16. Hence, the CPU of the handset 16 checks whether this facsimile reception key 60 has been pressed.

When the facsimile reception key 60 has not been pressed ("no" in S111), then the CPU of the handset 16 determines in S112 whether key operations designating a message box number have been performed. In other words, if the caller wishes to insert a message for a specific individual into a message box, the caller informs this request to the user of the handset 16, who presses the dial keys 51 for designating the message box number. The CPU checks whether such dial keys 51 have been pressed. This key operation is the same as that performed by the caller on the originating terminal to designate the message box number.

When key operations designating a message box number have not been performed ("no" in S112), then the CPU of the handset 16 determines in S113 whether key operations requesting a general retrieval have been performed. In other words, if the caller wishes to retrieve messages stored in the general mailbox not intended for a specific individual, the caller informs this request during the call to the user of the handset 16, who therefore presses predetermined dial keys 51. Hence the CPU checks for these dial keys 51. The key operation is the same as that performed by the caller on the originating terminal to request for the general retrieval by DTMF signals.

When key operations requesting the general retrieval have not been performed ("no" in S113), then the CPU of the handset 16 determines whether the hand-up key 53 has been pushed in S114. In other words, the CPU determines whether the user of the handset 16 has pressed the hang-up key 53 in order to end the call. When the hang-up key 53 has been pressed ("yes" in S114), then the CPU of the handset 16 transmits a disconnect command code to the communication unit 15 of the base unit 101 in S115, and the current routine ends. Accordingly, the base unit 101 disconnects the circuit.

In S114, if the hang-up key 53 has not been pressed ("no" in S114), then the above procedure is repeated from S111.

In S113, if key operations to request the general retrieval have been performed ("yes" in S113), then the CPU of the handset 16 transmits DTMF signals to the communication unit 15 of the base unit 101 to request a general retrieval in S116, and the current routine ends. Accordingly, the base unit 101 performs the same operation as when DTMF signals are inputted via the telephone circuit 21 from the originating terminal to request the general retrieval.

In S112, if key operations designating a message box number have been performed ("yes" in S112), then the CPU of the handset 16 transmits DTMF signals to the communication unit 15 of the base unit 101 to designate the message box number in S117, and the current routine ends. Accordingly, the base unit 101 performs the same operation as when DTMF signals are inputted via the telephone circuit 21 from the originating terminal to designate the message box number.

In S111, if the facsimile reception key 60 has been pressed ("yes" in S111), then the CPU of the handset 16 transmits to the communication unit 15 of the base unit 101 a command code for a general facsimile reception in S118, and the current routine ends. Accordingly, the base unit 101 performs the general facsimile reception process.

The base unit 101 performs a circuit monitor mode when the handset 16 is in the handset manual reception mode. The circuit monitor mode will be described below with reference to FIG. 10.

At the beginning of this circuit monitor mode, the CPU 1 determines in S121 whether a facsimile reception command code has been detected. In other words, the CPU 1 determines whether a facsimile reception command code has been received at the communication unit 15 from the handset 16. When a facsimile reception command code has not been received ("no" in S121), then the CPU 1 determines whether DTMF signals designating a message box number have been received, that is, whether the communication unit 15 of the base unit 101 has received such DTMF signals from the handset 16 or whether such DTMF signals have been entered via the telephone circuit 21.

When DTMF signals designating a message box number have not been detected ("no" in S122), then the CPU 1 determines whether DTMF signals requesting a general retrieval have been received in S123, that is, whether the communication unit 15 of the base unit 191 has received such DTMF signals from the handset 16 or whether such DTMF signals have been entered via the telephone circuit 21.

When DTMF signal requesting the general retrieval have not been detected ("no" in S123), then the CPU 1 determines whether the call has ended in S124, that is, whether the communication unit 15 has received a disconnect command code from the handset 16. When the call has been ended ("yes" in S124), then the CPU 1 controls the NCU 2 to disconnect the circuit in S125, and the current routine ends. However, when the call has not yet been ended ("no" in S124), then the processes described above beginning from S121 are repeated.

In S123, if DTMF signals for requesting the general retrieval have been detected ("yes" in S123), then the CPU 1 starts a general ICM playback in S126. More specifically, voice data stored in the voice data storage areas within the non-confidential data storage area of the RAM 3 is read, converted into analog voice signals by the codec 8, and sent by the NCU 2 via the telephone circuit 21.

Next, the CPU 1 determines in S127 whether the general ICM playback has been completed. When the general ICM playback has been completed ("yes" in S127), then the CPU 1 outputs a facsimile message notification sound in S128. More specifically, the CPU 1 reads out, from the answering message storage area of the RAM 3, voice data equivalent to a message notifying the caller that facsimile data will be transmitted. The voice data is then converted to analog voice signals by the codec 8, and sent by the NCU 2 via the telephone circuit 21. This message informs the caller at the originating terminal to begin facsimile reception by pressing the start key on the terminal.

Next, the CPU 1 begins transmitting facsimile data from the general mailbox in S129. More specifically, the facsimile data stored in the facsimile data storage areas of the non-confidential data storage area is read, modulated by the modem 4, and sent by the NCU 2 via the telephone circuit 21.

Then, the CPU 1 determines in S130 whether transmission of the facsimile data has been completed. When transmission of the data has been completed ("yes" in S97), then the circuit is disconnected in S125, and the current routine ends.

In S130, if transmission of the non-confidential facsimile data has not been completed ("no" in S130), then transmission of the facsimile data continues in S129. In S127, if playback of the general ICM has not been completed ("no" in S127), then playback of the general ICM continues in S126. In S122, if DTMF signals designating a box number have been detected ("yes" in S122), then the CPU 1 executes the message box process of S131 as shown in FIG. 6, and the current routine ends.

In S121, if a facsimile reception command code has been detected ("yes" in S121), then the CPU 1 performs a general facsimile reception in S132. Specifically, when the memory reception setting has been set, facsimile data is received via the telephone circuit 21 and stored in the facsimile data storage areas within the non-confidential data storage area of the RAM 3. When the memory reception setting has not been set, then the facsimile data received via the telephone circuit 21 is recorded by the recording unit 12 onto recording paper. Then, the CPU 1 determines in S133 whether reception of the non-confidential facsimile has been completed. When the reception has been completed ("yes" in S133), the CPU 1 disconnects the circuit in S125, and the current process ends. However, when the general facsimile reception has not been completed ("no" in S133), then the general facsimile reception is continued in S132.

The base unit 101 is in a sleep mode when transmission, reception, and copy operations are not being performed. The operations performed by the base unit 101 during the sleep mode according to key operations will be described below with reference to FIG. 11.

At the beginning of the sleep mode, the CPU 1 determines whether the function key 28 has been pressed in S140. In other words, the CPU 1 checks whether the user has pressed the function key 28 for storing a setting or entry in the RAM 3 or the EEPROM 6 of the present facsimile device 100, which setting or entry is unrelated to the message boxes.

When the function key 28 has not been pressed ("no" in S140), then the CPU 1 determines whether the box designating keys 23 have been pressed in S141. The box designating keys 23 not only designate message boxes, but are used to perform a one-touch dialing. Hence, the CPU 1 determines whether the user wishes to perform one-touch dialing.

When the box designating keys 23 have not been pressed ("no" in S141), then the CPU 1 determines whether the private key 29 has been pressed in S142. That is, the CPU 1 determines whether the user wishes to perform a message box-related entry, to control the display 45 to display a telephone directory, or to access a message box. When the private key 29 has not been pressed ("no" in S142), then the current routine ends. Therefore, in the sleep mode, the CPU 1 constantly checks for the user to press the function key 28, the box designating keys 23, or the private key 29 until one of those keys has been pressed.

In S142, if the private key 29 has been pressed ("yes" in S142), then the CPU 1 determines whether the dial keys 22 have been pressed in S143. In other words, the CPU 1 determines whether the user wishes to search the entire telephone directory rather than a portion of the directory classified for the message box of a specific individual. In the present embodiment, a telephone director represents a set of telephone numbers stored in the EEPROM 6 according to entry operations performed by the user. Stored along with each telephone number in the EEPROM 6 is such related data as the name of the person at that telephone number and a number representing the position of the entry in the telephone directory. Further, a group name can be entered for each telephone number in the telephone directory, allowing the creation of a private directory in which are compiled only the telephone numbers attached to the name of the same group. These group names correspond to the specific individuals assigned message boxes and have the same effect as creating a telephone directory for each message box. In other words, the telephone numbers only in a specific group can be used as a private telephone directory.

In S143, if the dial keys 22 have not been pressed ("no" in S143), then the CPU 1 determines whether the function key 28 has been pressed in S144. In other words, the CPU 1 determines whether the user has pressed the private key 29 followed by the function key 28 in order to perform a setting or entry related to a message box. When the function key 28 has not been pressed ("no" in S144), then the CPU 1 determines whether the box designating keys 23 have been pressed in S145. In other words, the CPU 1 determines whether the user has pressed the private key 29 followed by box designating keys 23 in order to use the private telephone directory or to access a message box.

When the box specifying keys 23 have not been pressed in S145 ("no" in S145), then the current routine ends. In other words, when none of the box designating keys 23, the function key 28, or the box designating keys 23 are pressed within a specified time after the private key 29 is pressed, the process which the user wishes to execute cannot be determined, and the current routine ends.

However, when a box designating key 23 has been pressed ("yes" in S145), a private process such as dialing using a private directory or accessing a message box is executed in S146, and the current routine ends. The private processes will be described later in more detail.

In S144, if the function key 28 has been pressed ("yes" in S144), then the CPU 1 determines whether any box designating key 23 has been pressed in S147. In other words, the CPU 1 determines whether the private key 29, the function key 28, and the box designating key 23 have been pressed in this sequence, indicating the user's desire to perform an entry in the message box designated by the box designating key 23.

When some box designating key 23 has been pressed ("yes" in S147), then various entries are performed in S148 based on the entry operations performed by the user, and the current routine ends. In other words, a group name, OGM, or the like are stored in either the RAM 3 or the EEPROM 6 in response to various key operations performed by the user. However, if any box designating key 23 has not been pressed ("no" in S147), then the current routine ends. In other words, when any box designating key 23 is not pressed within a predetermined time after the function key 28 is pressed, it is assumed that the user no longer wishes to perform a message box-related entry, and the current routine ends.

In S143, if dial keys 22 have been pressed ("yes" in S143), then the CPU 1 determines whether the start key 33 has been pressed in S149. Pressing the start key 33 after the private key 29 and the dial keys 22 indicates that the user wishes to dial the number specified by the dial keys 22. When the start key 33 has been pressed ("yes" in S149), then the specified telephone number is dialed in S150, and the current routine ends. That is, when the user inputs a desired two-digit sequence number listed in the telephone directory using the dial keys 22, the name or telephone number corresponding to that sequence number will be displayed on the screen of the LCD 45. The user confirms that this is the desired information by pressing the start key 33, causing the number displayed on the screen to be dialed automatically.

In S149, if the start key 33 has not been pressed ("no" in S149), then the current routine ends. In other words, when the start key 33 is not pressed within a specified amount of time after the dial keys 22 were pressed, it is assumed that the user no longer wishes to make a telephone call using the speed dial function of the private telephone directory, and the current routine ends.

In S141, if a box designating key 23 is pressed ("yes" in S141), indicating that the user wishes to dial the one-touch dial telephone number corresponding to the box designating key 23, then the CPU 1 determines whether the telephone receiver is on hook in S151. When the telephone receiver is on hook ("yes" in S151), then the CPU 1 determines whether the start key 33 has been pressed in S152. That is, when the user presses the box designating key 23 at this time, the name corresponding to the one-touch dial number corresponding to the box designating key 23 will be displayed on the screen of the LCD 45. The user confirms that this is the desired information by pressing the start key 33.

When the start key 33 has been pressed ("yes" in S152), then the CPU 1 dials the telephone number designated by the box designating key 23 in S153, and the current routine ends. However, when the start key 33 has not been pressed ("no" in S152), then the telephone number is not dialed, and the current process ends. In other words, when the start key 33 has not been pressed within a specified time after the box designating key 23 has bee pressed, it is assumed that the user no longer wishes to perform the one-touch dial, and the current routine ends.

In S151, if the telephone receiver is not on hook ("no" in S151), indicating that a circuit is already connected, then the telephone number is dialed in S153 without waiting for the start key 33 to be pressed.

In S140, if the function key 28 has been pressed ("yes" in S140), indicating that the user wishes to perform a setting or entry unrelated to the message boxes, then the setting or entry operation is performed in S154 according to key operations by the user, and the current routine ends.

Next, the private process of S146 will be described in more detail with reference to FIG. 12.

At the beginning of this process, the CPU 1 determines whether the correct PIN has been inputted in S160. More specifically, the CPU 1 checks whether the PIN corresponding to the message box designated by the box designating key 23 has been inputted by the dial keys 22. In other words, the PIN is verified to prevent fraudulent use of the private telephone directory and access of the message box by a person having no knowledge of the PIN for the message box.

When the correct PIN has been inputted ("yes" in S160), then the CPU 1 determines whether the delete key 25 has been pressed in S161. Pressing the delete key 25 indicates that the user wishes to delete a message stored in the message box. When the delete key 25 has not been pressed ("no" in S161), then the CPU 1 determines whether the playback key 26 has been pressed in S162. Pressing the playback key 26 indicates that the user wishes to playback a message stored in the message box. When the playback key 26 has not been pressed ("no" in S162), the CPU 1 determines whether the record key 24 has been pressed in S163. Pressing the record key 24 indicates that the user wishes to store a message in the message box. When the record key 24 has not been pressed ("no" in S163), then the CPU 1 determines whether the dial keys 22 have been pressed in S164. Pressing the dial keys 22 indicates that the user wishes to use the private telephone directory to call a number with speed dial.

When the dial keys 22 have not been pressed ("no" in S164), then the CPU 1 determines whether any box designating key 23 has been pressed in S165. To indicate a desire to retrieve a telephone number from the private telephone directory and call that number, the user either presses the box designating key 23 or the scroll keys 36 and 38. Hence, the CPU 1 first checks for the box specifying keys 23.

When any box designating key 23 has not been pressed ("no" in S165), then the CPU 1 determines whether any of the left and right scroll keys 36 and 38 have been pressed in S166, indicating that the user wishes to retrieve a telephone number from the private telephone directory and call that number, as described above.

When the left and right scroll keys 36 and 38 have not been pressed ("no" in S166), then the current routine ends. In other words, when no key operations are made within a specific amount of time after the correct PIN has been inputted, it is assumed that the user no longer wishes to use the private telephone directory or access the message box, and the current routine ends.

In S166, if either the left scroll key 36 or the right scroll key 38 have been pressed ("yes" in S166), then the CPU 1 determines whether the start key 33 has been pressed in S167. That is, when the user presses the left scroll key 36 or the right scroll key 38, the names of remote communication terminals stored in the private telephone directory displayed on the screen of the LCD 45 change in order. The user then presses the start key 33 when the desired name is displayed on the LCD 45.

When the start key 33 has been pressed ("yes" in S167), then the CPU 1 dials the telephone number corresponding to the name displayed on the LCD 45 in S168, and the current routine ends. However, when the start key 33 has not been pressed ("no" in S167), then the telephone number is not dialed, and the current process ends. In other words, if the start key 33 has not been pressed within a specified amount of time after either the left scroll key 36 or the right scroll key 38 was pressed, it is assumed that the user no longer wishes to dial the telephone number indexed in the private telephone directory, and the current process ends.

In S165, if some box designating key 23 has been pressed ("yes" in S165), then the processes beginning from S167 are executed to determine whether the start key 33 has been pressed. In other words, similar to when the scroll keys 36 and 38 are pressed, each time the user presses one box designating key 23, the screen of the LCD 45 changes to display the transmission destination name in the personal telephone directory corresponding to the inputted box designating key 23. The user then presses the start key 33 when the desired name is displayed on the LCD 45.

In S164, if the dial keys 22 have been pressed ("yes" in S164), then the CPU 1 determines whether the telephone receiver is on hook in S169. When the telephone is on hook ("yes" in S169), then the processes beginning from S167 are executed. However, when the telephone is not on hook ("no" in S169), then the start key 33 need not be pressed, and the telephone number is dialed in S168.

In S163, if the record key 24 has been pressed ("yes" in S163), then the CPU 1 determines whether the telephone receiver is on hook in S170. When the telephone is on hook ("yes" in S170), then a box memo is recorded to the message box in S171, and the current process ends. However, if the telephone is not on hook ("no" in S170), then a box conversation is recorded to the message box in S172, and the current process ends. Here, box memo refers to storing voice data in the message box, which data is created from the voice of the user inputted via a microphone provided separately from the telephone receiver. Box conversation refers to storing voice data in the message box, which data is created from both the voice of the user and of the person on the other end of the telephone line inputted via the telephone circuit 21.

In S162, if the playback key 26 has been pressed ("yes" in S162), then the CPU 1 plays back the voice messages stored in the message box in S173 and reproduces facsimile messages stored in the message box in S174, and the current routine ends. Voice messages are played back via the speaker in the telephone receiver, if the receiver is off hook, and played back via a separately provided speaker, if the telephone receiver is on hook. Facsimile messages are printed onto recording paper by the recording unit 12, based on the facsimile data stored in the message box.

In S161, if the delete key 25 has been pressed ("yes" in S161), then the CPU 1 deletes the messages stored in the message box in S175, and the current routine ends. In S160, if the correct PIN has not been inputted ("no" in S160), then the current routine ends.

Figure 12:
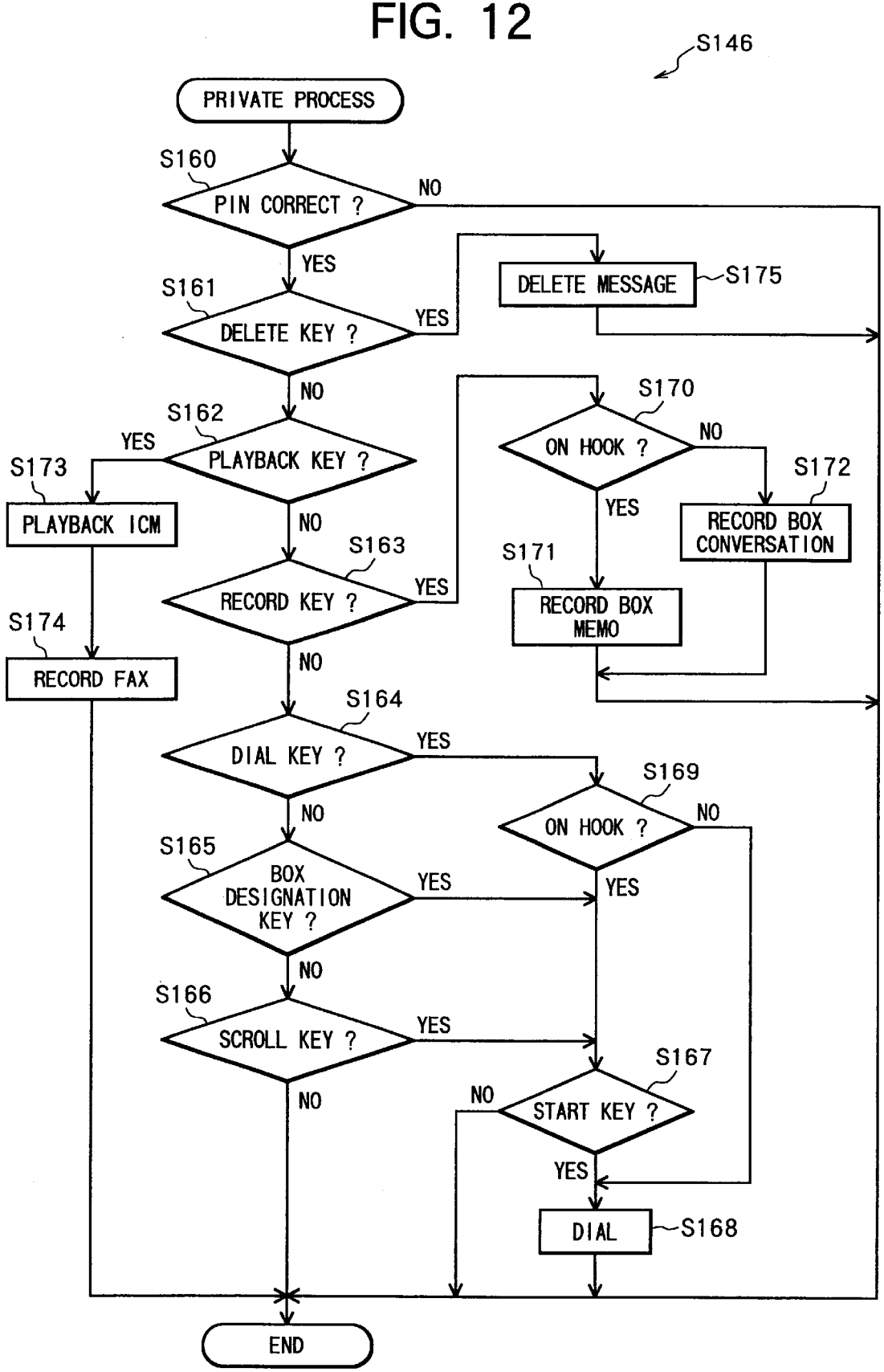
FIG. 12 is a flowchart explaining in detail a private process in the flowchart of FIG. 11.

It is noted that although the simple description "message box" is used in the above-description for the process of FIG. 12, message box obviously refers to the message box that the user has designated using the box designating key 23.

As described above, according to the present embodiment, the communication device is provided with a confidential data input/output control unit for permitting in S98 operations of either a confidential data input unit or a confidential data output unit based on predetermined operations performed by the user ("yes" in S87) or predetermined data inputted via the communication circuit ("yes" in S88) even when the communication circuit is connected in S84 based on the user's execution of predetermined operation ("yes" in S83) in response to calling signals inputted via the communication circuit. Hence, even when the user answers the telephone in response to the telephone ring, the caller can still access a message box without having to first hang up and redial.

The confidential data input control unit permits operations of the confidential data input unit in S14, S75, or S98 based on the predetermined operations performed by the user ("yes" in S87) or the predetermined data inputted via the communication circuit ("yes" in S8, S68, or S88) even when the communication device is set in the voice/image switching mode (F/T mode), the manual reception mode, or the answering mode. The voice/image switching mode (F/T mode) is for determining whether data inputted via the communication circuit is voice data or image data and automatically switching the reception operations accordingly. The manual reception mode is for switching the reception mode according to specific operations performed by the user when the data inputted via the communication device is image data. The answering mode is for automatically storing data inputted via the communication device.

The confidential data input/output control unit permits operations of either the confidential data input unit or the confidential data output unit in S131 also based on predetermined data transmitted from a handset ("yes" in S122) according to predetermined operations performed on the handset by the user.

As described above, according to the communication device of the present embodiment, the confidential data storage unit (message box) is designed to be capable of storing confidential data for specific individuals, which data is inputted via a communication circuit. The confidential data input unit is designed for inputting, into the confidential data storage unit, confidential data for the specific individuals, which data has been inputted via the communication circuit. The confidential data input/output control unit permits operations of the confidential data input unit based on the predetermined information inputted via the communication circuit or on the predetermined operation performed by the user on the communication device even when the communication circuit is connected according to the user's execution of a predetermined circuit connecting operation in response to calling signals inputted via the communication circuit. With this structure, the communication device is extremely convenient in that, even if the user responds to the call from the caller and answers the telephone, the caller can input his/her message into the message box without first disconnecting the circuit and redialing.

According to the present embodiment, the confidential data output unit is designed to read confidential data for a specific individual, which confidential data is stored in the confidential data storage unit, and outputs the confidential data via the communication circuit. The confidential data input/output control unit permits operations of the confidential data input unit or the confidential data output unit based on the predetermined information inputted via the communication circuit or the predetermined operation performed by the user onto the communication device even when the communication circuit is connected according to the user's execution of the predetermined circuit connecting operation in response to calling signals inputted via the communication circuit. With this structure, the communication device is extremely convenient in that, even if the user responds to the call from the caller and answers the telephone, the caller can obtain message from his/her message box without first disconnecting the circuit and redialing.

Additionally, according to the present embodiment, the confidential data input/output control unit permits operations of the confidential data input unit or the confidential data output unit based on the predetermined information inputted via the communication circuit or on the predetermined operation performed by the user on the communication device regardless of whether the communication device is in the voice/image switching mode, the manual reception mode, or the answering mode. Accordingly, the communication device is very convenient in that the caller can reliably leave his/her message in a message box and can obtain message from his/her own message box at any time of convenience, since it is possible to input message in and extract message from a message box not only when the communication device is set in the answering mode, but also when the communication device is set in the voice/image switching mode (facsimile/telephone switching mode) and in the manual reception mode.

The confidential data input/output control unit permits operations of the confidential data input unit or the confidential data output unit based on the predetermined information transmitted from the handset according to the predetermined operations performed by the user onto the handset. With this structure, the communication device is extremely convenient in that based on the predetermined information transmitted from the handset, data received from the communication circuit can be inputted into the message box and data can be outputted from the message box and transmitted via the communication circuit.

For example, if Mr. A calls Mr. B's facsimile device of the present embodiment to input a message into Mr. B's message box but the facsimile device is not set in the answering mode, Mr. A can store his message in Mr. B's message box even if Mr. C answers the telephone and without having to first hang up the telephone and redial. Mr. A can accomplish this by requesting Mr. C to perform the predetermined operations to store his message into Mr. B's message box, or by operating a facsimile device of Mr. A's own to transmit predetermined DTMF signals. Of course, the message can be a voice, or text or other type of image data.

It is therefore possible to eliminate the problem of having to hang up and redial after requesting Mr. C, who answers the telephone, to change the telephone mode setting. Further, the communication device is very convenient in that Mr. C can perform the predetermined operations on a handset at any location, regardless of the location of the base unit, and even while moving about the room. Further, if Mr. A calls Mr. B's facsimile device to input a message into Mr. B's message box, even if the facsimile device is set in the facsimile/telephone switching mode, Mr. A can store his message in Mr. B's message box by operating the facsimile device of Mr. A's own to transmit the predetermined DTMF signals.

If Mr. D calls the facsimile device from outside to extract messages from his own message box but the facsimile device is not set in the answering mode, Mr. D can still extract the data from his message box even if Mr. E answers the telephone and without having to hang up the telephone and redial. Mr. D can accomplish this by requesting Mr. E to perform the predetermined operations to output the messages from Mr. D's message box, or Mr. D can operate a facsimile device from which he is placing the call and transmit the predetermined DTMF signals. Of course, if the message is a voice message, Mr. D can listen to the message from the telephone receiver on the facsimile device form which he is calling. If the message is image data, Mr. D can have the message printed out on the facsimile device from which he is calling or displayed on a display screen.

It is therefore possible to eliminate the problem of having to hang up and redial after requesting Mr. E, who answers the telephone, to change the telephone mode setting. Further, the communication device is very convenient in that Mr. E can perform the predetermined operations on a handset at any location, regardless of the location of the base unit, and even while moving about the room.

Of course, it is possible for operations of the confidential data input unit or the confidential data output unit to be permitted by the confidential data input/output control unit only when the predetermined operations are performed by the user, only when the predetermined data is inputted via the communication circuit, or when either the predetermined operations are performed by the user or the predetermined data is inputted via the communication circuit.

The communication circuit can be a public or private circuit and can be wired or wireless. Wireless transmission between the base unit and the handset can be performed using radio waves or light.

A volatile memory such as a RAM and a rewritable nonvolatile memory such as an EEPROM, or even a hard disk drive, can be used for the confidential data storage areas. When using a nonvolatile memory, it is suitable to provide the communication device with a battery for use as a backup power source.

The number of the confidential data storage areas is arbitrary, but when a plurality of confidential data storage areas are provided, it is necessary to input indication data to indicate with which confidential data storage areas an input/output operation will be performed.

The communication device can be a facsimile device or a telephone device, but is not limited to these. In addition, the communication device can be a personal computer, a word processor, or an electronic photocopying device which is provided with telephone communication function and facsimile transmission and reception functions.

The confidential data input unit, the confidential data output unit, and the confidential data input/output control unit are constructed from operations of a CPU or a microprocessor based on a predetermined program.

From the viewpoint of preserving the security of confidential data stored in the confidential data storage areas, it is desirable to previously register security data for each confidential data storage area, and to require the caller to correctly enter the security data as a PIN in order to obtain data from the confidential data storage area.

When the operating mode of the communication device is set to the answering mode, operations of the confidential data input unit and the confidential data output unit are permitted according to the user's execution of the predetermined operations or the inputting of the predetermined data from the caller even when the user does not perform predetermined operations to connect the telephone circuit.

The predetermined operation performed by the user to connect the communication circuit are not limited to lifting the telephone receiver off the hook, but can also be key operations for switching on the speaker and the microphone in place of the telephone receiver.

The predetermined operations performed by the user to allow the confidential data input/output control unit to permit operations of the confidential data input unit or the confidential data output unit can be pushing a plurality of operating keys in a predetermined sequence. However, the operations are not limited to the operating keys, but can include operations using a mouse device.

Similarly, the predetermined operations performed by the user on the handset can consist of pushing a plurality of dial keys in a predetermined order. However, the predetermined operation is not limited to the dial keys.

The predetermined data for allowing the confidential data input/output control unit to permit operations of the confidential data input unit or the confidential data output unit can be predetermined DTMF signal data inputted via the communication circuit according to predetermined dial key operations performed by the caller.

Additionally, according to the present embodiment, the plurality of the confidential data storage areas are provided in correspondence with a plurality of specific individuals. The confidential data input control unit inputs received data for a specific individual into one confidential data storage area indicated by indication data inputted via the communication circuit or by indication operation performed by the user onto the communication device. The confidential data output unit reads from one confidential data storage area, and outputs the confidential data via the communication circuit, the confidential data storage area being indicated by indication data inputted via the communication circuit or by indication operation performed by the user onto the communication device.

Because the communication device is provided with a plurality of confidential data storage areas, confidential data for a plurality of individuals can be stored separately by indicating one of the confidential data storage areas with the indication operations or the indication data. Further, the confidential data storage areas can be selectively accessed.

Here, the indication operations can consist of pushing alphanumeric keys or performing operations using a mouse device.

The indication data can be DTMF signal data inputted via the communication circuit according to specific dial key operations performed by the caller.

According to the present embodiment, the terminal identification data storage unit is designed for storing terminal identification data indicative of at least one terminal in correspondence with each of the plurality of confidential data storage areas. The confidential data input notification unit is provided for, when the confidential data input unit inputs confidential data into one confidential data storage area, reading the terminal identification data corresponding to the confidential data storage area from the terminal identification data storage unit and transmitting, to the at least one terminal of a specific individual corresponding to the confidential data storage area, data notifying that the confidential data storage area is stored with confidential data.

With this structure, the communication device is extremely convenient in that each confidential data storage area is set with terminal identification data for an arbitrary number of communication terminals and can, therefore, notify these communication terminals when confidential data has been inputted. In other words, even if a specific individual to whom confidential data is sent is away from the communication device, that individual can be promptly notified that confidential data has been inputted into the communication device if the individual is in possession of a communication terminal corresponding to the set terminal identification data or is near the location of that communication terminal.

Since it is not always necessary to perform this function, it may be desirable to allow the function to be selectively turned on and off. Further, it is possible to only perform this function when the communication device of the present embodiment is set in the answering mode. Although not limited to the following, the communication terminal can be a wired or wireless telephone device, a facsimile device, a pager device, or the like.

The confidential data input notification unit also informs the specific individual the confidential data itself in addition to notifying the individual that confidential data is stored in the confidential data storage area. With this structure, the communication device is very convenient in that even the contents of the confidential data can be transmitted to the communication terminal when the communication terminal is notified that the confidential data is stored in the confidential data storage area. In other words, even if the specific individual to whom confidential data is sent is away from the communication device, that individual can promptly receive the contents of the confidential data rather than simply being notified that the confidential data has been inputted, if the individual is in possession of a communication terminal corresponding to the set terminal identification data or is near the location of that communication terminal. In this case, it is possible to eliminate the process of operating the communication terminal to remotely control the communication device of the present embodiment to transfer the confidential data to the communication terminal.

The confidential data input/output control unit requires that, in addition to the predetermined operations performed by the user or the predetermined information inputted via the communication circuit, security access data established for the confidential data storage unit be inputted via the communication circuit, in order to permit operations of the confidential data output unit. With this structure, the communication device can satisfactorily prevent fraudulent access of confidential data because the contents of the confidential data storage areas is outputted only when the caller correctly enters the PIN. It is noted that the PIN can be DTMF signal data inputted via the communication circuit according to a specific dial key operation sequence performed by the caller.

According to the present embodiment, the non-confidential data storage unit is provided for storing non-confidential data not intended especially for any specific individuals, which non-confidential data is inputted via the communication circuit. The non-confidential data output unit is provided for outputting non-confidential data via the communication circuit from the non-confidential data storage unit. The non-confidential data input/output control unit is provided for permitting operations of the non-confidential data input unit or the non-confidential data output unit based on the predetermined information inputted via the communication circuit or on the predetermined operations performed by the user onto the communication device.

With this structure, the communication device is even more convenient in that the non-confidential data input/output control unit permits operations of the non-confidential data output unit or the non-confidential data input unit based on the predetermined information inputted via the communication circuit or on the predetermined operations performed by the user onto the communication device.

According to the present embodiment, the above-described functions of the communication device are stored as a program in the program storage medium (ROM) 5.

That is, the program storage medium stores a program of controlling the communication device provided with the confidential data storage unit (message box) and capable of receiving confidential data for specific individuals via a communication circuit. The program includes: a program of inputting, into the confidential data storage unit, confidential data for the specific individuals, which data has been inputted via the communication circuit; and a program of permitting execution of the confidential data input program based on the predetermined information inputted via the communication circuit or on the predetermined operation performed by the user on the communication device even when the communication circuit is connected according to the user's execution of a predetermined circuit connecting operation in response to calling signals inputted via the communication circuit.

The program further includes a program of reading the confidential data for a specific individual from the confidential data storage unit and outputs the confidential data via the communication circuit. The confidential data input/output control program is designed to permit execution of the confidential data input unit or the confidential data output unit based on the predetermined information inputted via the communication circuit or the predetermined operation performed by the user onto the communication device even when the communication circuit is connected according to the user's execution of the predetermined circuit connecting operation in response to calling signals inputted via the communication circuit.

Additionally, the confidential data input/output control program is designed to permit execution of the confidential data input program or the confidential data output program based on the predetermined information inputted via the communication circuit or on the predetermined operation performed by the user on the communication device regardless of whether the communication device is in the voice/image switching mode, the manual reception mode, or the answering mode.

The confidential data input/output control program is designed to permit execution of the confidential data input program or the confidential data output program based on the predetermined information transmitted from the handset according to the predetermined operations performed by the user onto the handset.

Thus, the operations of the communication device can be achieved by operating the CPU and the like based on the programs stored in the storage medium.

While the invention has been described in detail with reference to the specific embodiment thereof, it would be apparent to those skilled in the art that various changes and modifications may be made therein without departing from the spirit of the invention.

What is claimed is:

1. A communication device capable of transmitting and receiving data via a communication circuit, the device comprising:

circuit control means connecting a communication circuit;

data reception means capable of receiving confidential data for at least one specific individual transmitted via the communication circuit;

confidential data storage means capable of storing the received confidential data for the at least one specific individual;

confidential data input means for inputting the received confidential data for the at least one specific individual into the confidential data storage means;

input means capable of receiving a user's performed first predetermined operation;

information reception means capable of receiving first predetermined information in the form of a first predetermined DTMF signal transmitted via the connected communication circuit;

input detecting means for performing, after the circuit control means connects the communication circuit, at least one of a detection of detecting whether or not the information reception means receives the first predetermined information via the connected communication circuit and another detection of detecting whether or not the input means receives the user's performed first predetermined operation; and confidential data input control means for controlling the confidential data input means to input the received confidential data into the confidential data storage means when a detection result of the input detecting means shows either that the information reception means receives the first predetermined information or that the input means receives the user's performed first predetermined operation.

2. A communication device as claimed in claim 1, wherein the input detecting means includes:

information reception detecting means for detecting, after the circuit control means connects the communication circuit, whether or not the information reception means receives the first predetermined information transmitted via the connected communication circuit; and operation reception detecting means for detecting, after the circuit control means connects the communication circuit, whether or not the input means receives the first predetermined operation; and wherein the confidential data input control means includes control means for controlling the confidential data input means to input the received confidential data into the confidential data storage means either when the information reception detecting means detects that the information reception means receives the first predetermined information or when the operation reception detecting means detects that the input means receives the first predetermined operation.

3. A communication device as claimed in claim 2, wherein the circuit control means connects the communication circuit according to the user's execution of a predetermined operation in response to calling signals transmitted via the communication circuit, wherein the control means controls the confidential data input means to input the received confidential data into the confidential data storage means either when the information reception detecting means detects that the information reception means receives the first predetermined information or when the operation reception detecting means detects that the input means receives the first predetermined operation even after the circuit control means connects the communication circuit according to the user's execution of the predetermined operation in response to the calling signals transmitted via the communication circuit.

4. A communication device as claimed in claim 2, further comprising mode control means capable of setting a voice/image switching mode, a manual reception mode, and an answering mode, wherein the control means controls the confidential data input means to input the received confidential data into the confidential data storage means either when the information reception detecting means detects that the information reception means receives the first predetermined information or when the operation reception detecting means detects that the input means receives the first predetermined operation regardless of whether the mode control means sets either one of the voice/image switching mode, the manual reception mode, and the answering mode.

5. A communication device as claimed in claim 2, further comprising data communication means capable of wirelessly transmitting and receiving data with a handset, wherein the control means controls the confidential data input means to input the received confidential data into the confidential data storage means either when the information reception detecting means detects that the information reception means receives the first predetermined information, when the operation reception detecting means detects that the input means receives the first predetermined operation, or when the data communication means receives first additional predetermined information transmitted from the handset in response to the user's execution of a first additional predetermined operation onto the handset.

6. A communication device as claimed in claim 1, wherein the input means is capable of receiving the user's performed second predetermined operation, the information reception means being capable of receiving second predetermined information in the form of a second predetermined DTMF signal transmitted via the connected communication circuit, further comprising:

confidential data output means for reading the confidential data for the at least one specific individual from the confidential data storage means, and for transmitting the confidential data via the communication circuit; and confidential data output control means for controlling the confidential data output means to read the confidential data for the at least one specific individual from the confidential data storage means and to transmit the confidential data via the communication circuit when a detection result of the input detecting means shows either that the information reception means receives the second predetermined information or that the input means receives the user's performed second predetermined operation.

7. A communication device as claimed in claim 6, wherein the input detecting means includes:
   information reception detecting means for detecting, after the circuit control means connects the communication circuit, whether or not the information reception means receives the second predetermined information via the connected communication circuit; and
   operation reception detecting means for detecting, after the circuit control means connects the communication circuit, whether or not the input means receives the second predetermined operation; and
   wherein the confidential data output control means includes control means for controlling the confidential data output means to read the confidential data from the confidential data storage means and to transmit the confidential data via the communication circuit either when the information reception detecting means detects that the information reception means receives the second predetermined information or when the operation reception detecting means detects that the input means receives the second predetermined operation.

8. A communication device as claimed in claim 7, wherein the circuit control means connects the communication circuit according to the user's execution of a predetermined operation in response to calling signals transmitted via the communication circuit,
   wherein the control means controls the confidential data output means to read the confidential data from the confidential data storage means and to output the confidential data via the communication circuit either when the information reception detecting means detects that the information reception means receives the second predetermined information or when the operation reception detecting means detects that the input means receives the second predetermined operation even after the circuit control means connects the communication circuit according to the user's execution of the predetermined operation in response to the calling signals transmitted via the communication circuit.

9. A communication device as claimed in claim 7, further comprising mode control means capable of setting a voice/image switching mode, a manual reception mode, and an answering mode,
   wherein the control means controls the confidential data output means to read the confidential data from the confidential data storage means and to output the confidential data via the communication circuit either when the information reception detecting means detects that the information reception means receives the second predetermined information or when the operation reception detecting means detects that the input means receives the second predetermined operation regardless of whether the mode control means sets either one of the voice/image switching mode, the manual reception mode, and the answering mode.

10. A communication device as claimed in claim 7, further comprising data communication means capable of wirelessly transmitting and receiving data with a handset,
    wherein the control means controls the confidential data output means to read the confidential data from the confidential data storage means and to output the confidential data via the communication circuit either when the information reception detecting means detects that the information reception means receives the second predetermined information, when the operation reception detecting means detects that the input means receives the second predetermined operation, or when the data communication means receives second additional predetermined information transmitted from the handset in response to the user's execution of a second additional predetermined operation onto the handset.

11. A communication device as claimed in claim 7, wherein the confidential data output control means further includes reception means for receiving security access data in the form of a DTMF signal for the confidential data storage means via the communication circuit, the control means controlling the confidential data output means either when the reception means receives security access data and the information reception detecting means detects that the information reception means receives the second predetermined information or when the reception means receives security access data and the operation reception detecting means detects that the input means receives the second predetermined operation.

12. A communication device as claimed in claim 6, wherein the data reception means is capable of receiving non-confidential data via the communication circuit,
    further comprising:
    non-confidential data storage means capable of storing the received non-confidential data;
    non-confidential data input means for inputting the received non-confidential data into the non-confidential data storage means; and
    non-confidential data input control means for controlling the non-confidential data input means to input the received non-confidential data into the non-confidential data storage means based on either third predetermined information inputted via the communication circuit or a third predetermined operation performed by the user.

13. A communication device as claimed in claim 12, wherein the non-confidential data input control means includes:
    information reception means capable of receiving the third predetermined information via the communication circuit;
    information reception detecting means for detecting whether or not the information reception means receives the third predetermined information;
    input means capable of receiving the user's performed third predetermined operation;
    operation reception detecting means for detecting whether or not the input means receives the third predetermined operation; and
    control means for controlling the non-confidential data input means to input the received non-confidential data into the non-confidential data storage means either when the information reception detecting means detects that the information reception means receives the third predetermined information or when the operation reception detecting means detects that the input means receives the third predetermined operation.

14. A communication device as claimed in claim 12, further comprising:
    non-confidential data output means for reading the non-confidential data from the non-confidential data storage means, and for outputting the non-confidential data via the communication circuit; and non-confidential data output control means for controlling the non-confidential data output means to read the non-confidential data from the non-confidential data storage means and to output the non-confidential data via the communication circuit based on either fourth predetermined information inputted via the communication circuit or a fourth predetermined operation performed by the user.

15. A communication device as claimed in claim 14, wherein the non-confidential data output control means includes:

information reception means capable of receiving the fourth predetermined information via the communication circuit;

information reception detecting means for detecting whether or not the information reception means receives the fourth predetermined information;

input means capable of receiving the user's performed fourth predetermined operation;

operation reception detecting means for detecting whether or not the input means receives the fourth predetermined operation; and control means for controlling the non-confidential data output means to read the non-confidential data from the non-confidential data storage means and to output the non-confidential data via the communication circuit either when the information reception detecting means detects that the information reception means receives the fourth predetermined information or when the operation reception detecting means detects that the input means receives the fourth predetermined operation.

16. A communication device as claimed in claim 6, wherein the confidential data storage means includes a plurality of storage areas capable of storing confidential data for a plurality of specific individuals, the first predetermined information including data indicating one storage area, to which the confidential data is desired to be inputted, the first operation indicating one storage area, to which the confidential data is desired to be inputted, the second predetermined information including data indicating one storage area, from which the confidential data is desired to be outputted, the second operation indicating one storage area, from which the confidential data is desired to be outputted, wherein the confidential data input control means controls the confidential data input means to input the received confidential data into one confidential data storage area that is indicated by either the first predetermined information inputted via the communication circuit or the first predetermined operation performed by the user, and wherein the confidential data output control means controls the confidential data output means to output the confidential data from one confidential data storage area that is indicated by either the second predetermined information inputted via the communication circuit or the second predetermined operation performed by the user.

17. A communication device as claimed in claim 16, further comprising:

terminal identification data storage means for storing terminal identification data indicative of at least one terminal for each of the plurality of specific individuals; and confidential data input notification means for, when the confidential data input control means controls the confidential data input means to input the received confidential data into one of the plurality of confidential data storage areas, reading the terminal identification data corresponding to the confidential data storage area from the terminal identification data storage means and for transmitting, via the communication circuit to the at least one terminal indicated by the read terminal identification data, data notifying the specific individual for the confidential data storage area that the confidential data is stored in the confidential data storage area.

18. A communication device as claimed in claim 17, wherein the confidential data input notification means transmits also the confidential data, stored in the confidential data storage area, via the communication circuit to the at least one terminal indicated by the read terminal identification data.

19. A communication system for transmitting and receiving data via a communication circuit, the communication system comprising:

a base unit capable of connecting a communication circuit and transmitting and receiving data via the connected communication circuit; and a handset capable of wirelessly transmitting and receiving data with the base unit, the handset including detecting means for detecting a user's executed predetermined operation and transmission means for wirelessly transmitting to the base unit predetermined information corresponding to the user's executed predetermined operation when the detecting means detects the user's executed predetermined operation, wherein the base unit includes:

confidential data reception means capable of receiving confidential data for the at least one specific individual via the communication circuit;

confidential data storage means capable of storing the received confidential data for the least one specific individual;

confidential data input means for inputting the received confidential data for the at least one specific individual into the confidential data storage means; and confidential data input control means for controlling the confidential data input means to input the received confidential data into the confidential data storage means based on the predetermined information transmitted from the handset.

20. A communication system as claimed in claim 19, wherein the confidential data input control means includes:

information reception means capable of receiving the predetermined information from the handset;

information reception detecting means for detecting whether or not the information reception means receives the predetermined information; and control means for controlling the confidential data input means to input the received confidential data into the confidential data storage means when the information reception detecting means detects that the information reception means receives the predetermined information.

21. A communication system as claimed in claim 19, wherein the handset includes additional detecting means for detecting a user's executed additional predetermined operation and additional transmission means for transmitting to the base unit additional predetermined information corresponding to the user's executed additional predetermined operation when the detecting means detects the user's executed additional predetermined operation, wherein the base unit further includes:
confidential data output means for reading the confidential data for the at least one specific individual from the confidential data storage means, and for outputting the confidential data via the communication circuit; and confidential data output control means for controlling the confidential data output means to read the confidential data for the at least one specific individual from the confidential data storage means and to output the confidential data via the communication circuit based on the additional predetermined information transmitted from the handset.

22. A communication system as claimed in claim 21, wherein the confidential data output control means includes:
information reception means capable of receiving the additional predetermined information from the handset;
information reception detecting means for detecting whether or not the information reception means receives the additional predetermined information; and
control means for controlling the confidential data output means to read the confidential data from the confidential data storage means and to output the confidential data via the communication circuit when the information reception detecting means detects that the information reception means receives the additional predetermined information.

23. A communication system as claimed in claim 21, wherein the confidential data storage means includes a plurality of storage areas capable of storing confidential data for a plurality of specific individuals, the predetermined information including data indicating one storage area, to which the confidential data is desired to be inputted, the additional predetermined information including data indicating one storage area, from which the confidential data is desired to be outputted,
wherein the confidential data input control means controls the confidential data input means to input the received confidential data into one confidential data storage area that is indicated by the predetermined information transmitted from the handset, and
wherein the confidential data output control means controls the confidential data output means to output the confidential data from one confidential data storage area that is indicated by the additional predetermined information transmitted from the handset.

24. A communication system as claimed in claim 22, wherein the confidential data output control means further includes reception means for receiving security access data for the confidential data storage means via the communication circuit, the control means controlling the confidential data output means when the reception means receives security access data via the communication circuit and the information reception detecting means detects that the information reception means receives the additional predetermined information from the handset.

25. A program storage medium for storing data of a program indicative of a process for controlling a communication device connected to a communication circuit, the communication device including a storage area capable of storing received confidential data for at least one specific individual, the program comprising:
a program of connecting a communication circuit;
a program of receiving confidential data for at least one specific individual via a communication circuit;
a program of inputting the received confidential data for the at least one specific individual into the storage area;

a program of performing, after the communication circuit is connected, at least one of a detection of detecting whether or not predetermined information in the form of a predetermined DTMF signal is received via the communication circuit and another detection of detecting whether or not a user inputs a predetermined operation to the communication device; and
a program of controlling the confidential data inputting program to input the received confidential data into the confidential data storage either when the predetermined information is received via the communication circuit or when the predetermined operation is performed by the user.

26. A program storage medium for storing data of a program indicative of a process for controlling a communication system including a base unit connected to a communication circuit and a handset which wirelessly communicate data with the base unit, the base unit including a confidential data storage area capable of storing confidential data for at least one specific individual, the program comprising:
a program of controlling a handset to detect a user's executed predetermined operation;
a program of controlling a handset to transmit to the base unit predetermined information corresponding to the user's executed predetermined operation when the user's executed predetermined operation is detected;
a program of controlling a base unit to receive confidential data for at least one specific individual via a communication circuit;
a program of inputting the received confidential data for the at least one specific individual into the confidential data storage area; and
a program of controlling the confidential data input program to input the received confidential data into the confidential data storage area based on the predetermined information transmitted from the handset.

27. A communication device capable of transmitting and receiving data via a communication circuit, the device comprising:
circuit control means connecting a communication circuit;
data communication means capable of receiving confidential data for at least one specific individual transmitted via the communication circuit and of transmitting confidential data for at least one specific individual via the communication circuit;
confidential data storage means including at least one storage area, each of which is capable of storing confidential data for each of the at least one specific individual;
input means capable of receiving a user's performed predetermined operation designating one storage area desired to be accessed;
signal reception means capable of receiving a predetermined DTMF signal transmitted via the connected communication circuit, the predetermined DTMF signal designating one storage area desired to be accessed, the signal reception means further being capable of receiving another predetermined DTMF signal transmitted via the connected communication circuit, the other predetermined DTMF signal indicating security access data for the at least one storage area;
first input detecting means for performing, after the circuit control means connects the communication circuit, at least one of a detection of detecting whether or not the signal reception means receives the predetermined DTMF signal designating one storage area via the connected communication circuit and another detection of detecting whether or not the input means receives the user's performed predetermined operation designating one storage area;

second input detecting means for, when the first input detecting means detects either that the signal reception means receives the predetermined DTMF signal or that the input means receives the user's performed predetermined operation, detecting whether or not the signal reception means receives the other predetermined DTMF signal indicative of security access data for the one storage area; and confidential data storage access means for, when the second input detecting means detects that the signal reception means receives no other predetermined DTMF signal, performing an input control for inputting, into the designated one storage area, confidential data received by the data communication means from the connected communication circuit, and for, when the second input detecting means detects that the signal reception means receives the other predetermined DTMF signal, performing an output control for reading confidential data that is stored in the designated one storage area and for controlling the data communication means to transmit the read confidential data via the communication circuit.

28. A communication device as claimed in claim 27, further comprising wireless communication means capable of wirelessly transmitting and receiving data with a handset, wherein the first input detecting means also detects whether or not the wireless communication means receives additional predetermined information in the form of an additional predetermined DTMF signal transmitted from the handset in response to the user's execution of an additional predetermined operation onto the handset, the additional predetermined DTMF signal designating one storage area desired to be accessed, and wherein the second input detecting means performs its detection when the first input detecting means detects either that the signal reception means receives the predetermined DTMF signal via the connected communication circuit, that the input means receives the predetermined operation, or that the wireless communication means receives the additional predetermined DTMF signal transmitted from the handset.

* * * * *